(12) United States Patent
Ueda

(10) Patent No.: US 7,458,697 B2
(45) Date of Patent: Dec. 2, 2008

(54) LAMP COOLING DEVICE AND REAR PROJECTION DISPLAY APPARATUS

(75) Inventor: Hirokazu Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 11 days.

(21) Appl. No.: 11/711,646

(22) Filed: Feb. 27, 2007

(65) Prior Publication Data

US 2007/0217203 A1 Sep. 20, 2007

(30) Foreign Application Priority Data

Mar. 14, 2006 (JP) ............................. 2006-069770

(51) Int. Cl.
*F21V 33/00* (2006.01)
(52) U.S. Cl. .................. 362/96; 362/126; 362/294
(58) Field of Classification Search ............ 362/96, 362/101, 125, 126, 294, 345, 373
See application file for complete search history.

(56) References Cited

U.S. PATENT DOCUMENTS 4,004,360 A * 1/1977 Hammond ............... 40/361

FOREIGN PATENT DOCUMENTS

| JP | 11-084533 | 3/1999 |
| JP | 2003-157715 A | 5/2003 |

* cited by examiner

*Primary Examiner*—John A Ward
(74) *Attorney, Agent, or Firm*—Wolf, Greenfield & Sacks, P.C.

(57) ABSTRACT

The present invention provides a lamp cooling device for cooling a lamp including a transparent front plate, a reflector that reflects light emitted from a light source to the transparent front plate, and the light source disposed in an interior space enclosed by the transparent front plate and the reflector. The lamp cooling device includes a closed pipe line through which a gas is circulated. The lamp has a gas intake opening and a gas exhaust opening, the openings communicating with the interior space. The pipe line is connected to both of the gas intake opening and the gas exhaust opening so as to include the interior space of the lamp. The pipe line includes a flexible portion connected to the gas intake opening and another flexible portion connected to the gas exhaust opening.

9 Claims, 33 Drawing Sheets

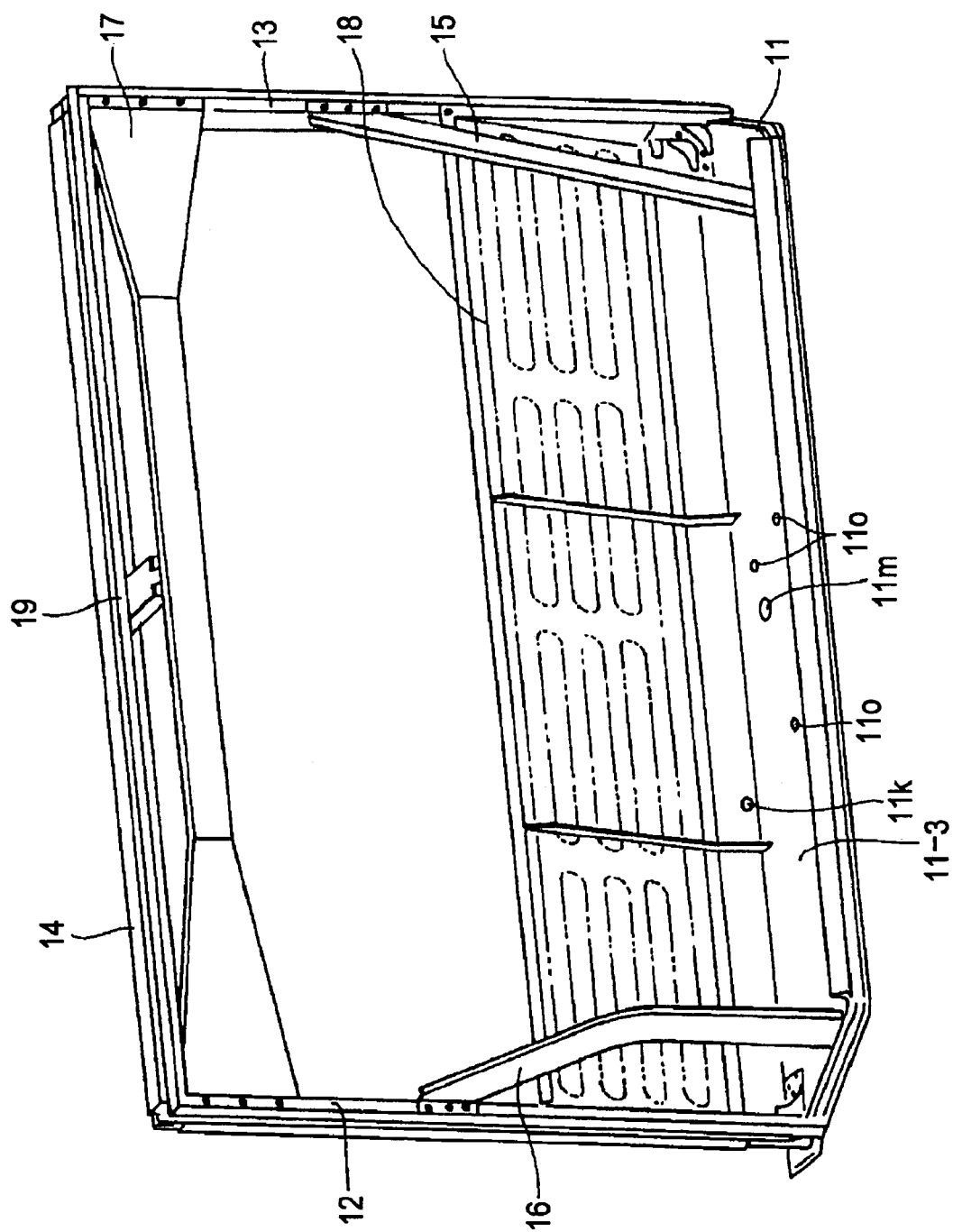

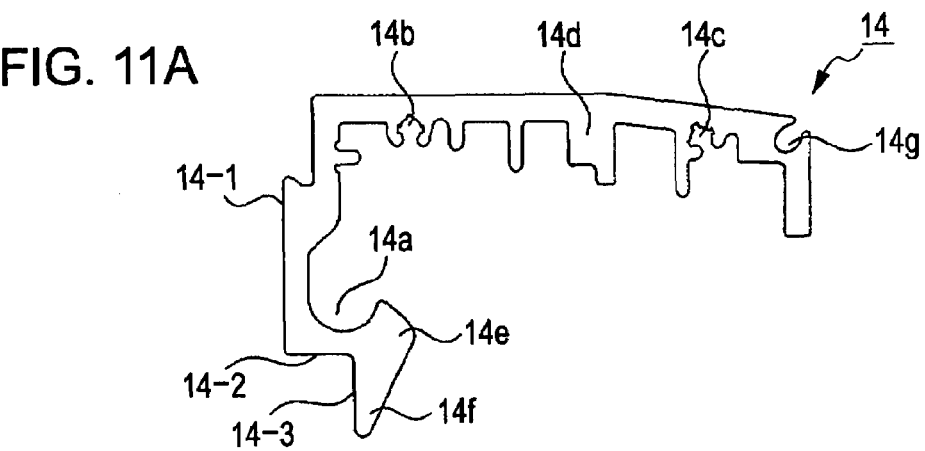
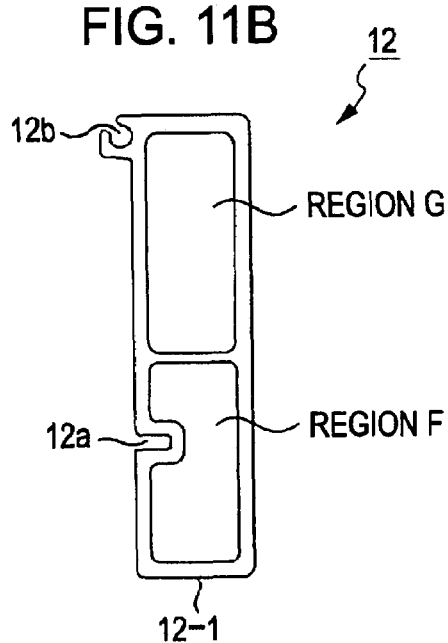
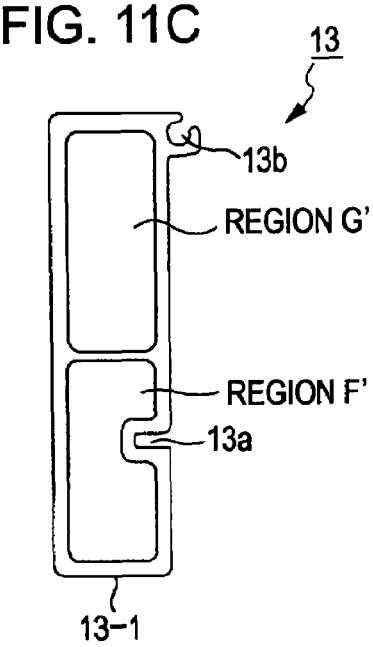
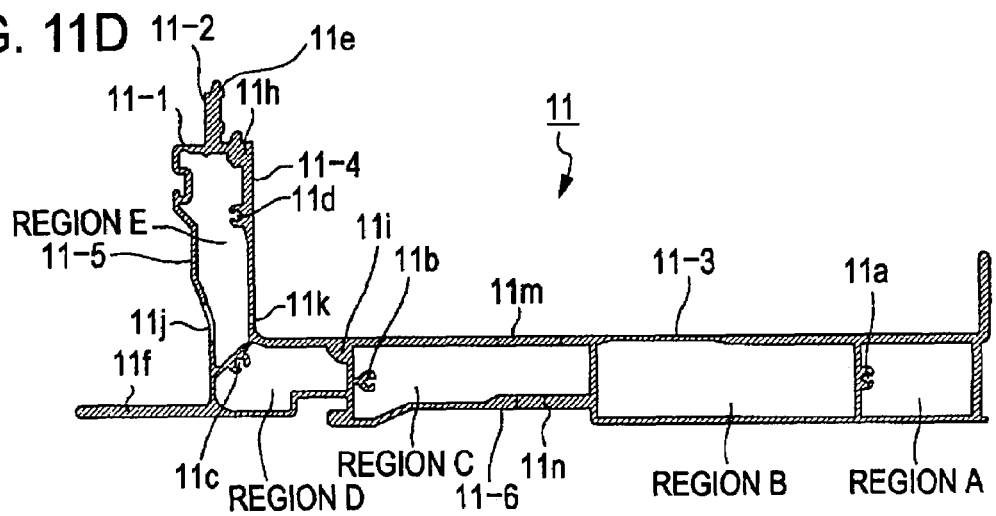

PRIOR ART

PRIOR ART

LAMP COOLING DEVICE AND REAR PROJECTION DISPLAY APPARATUS

CROSS REFERENCES TO RELATED APPLICATIONS

The present invention contains subject matter related to Japanese Patent Application JP 2006-069770 filed in the Japanese Patent Office on Mar. 14, 2006, the entire contents of which are incorporated herein by reference.

BACKGROUND OF THE INVENTION

1. Field of the Invention

The present invention relates to a lamp cooling device for cooling a lamp used as a light source and a rear projection display apparatus including the lamp cooling device.

2. Description of the Related Art

FIG. 35 shows an example of the internal structure of a known rear projection display apparatus. The rear projection display apparatus includes a projector 190, a first reflecting mirror 191, a second reflecting mirror 192, and a transmissive screen 193. The projector 190 is arranged in a lower rear portion in a cabinet of the apparatus. The first reflecting mirror 191 is disposed in a lower front portion in the cabinet. The second reflecting mirror 192 is arranged on an inner rear surface of the cabinet. The transmissive screen 193 is disposed in a front surface of the cabinet. A projection lens projects an image, which is generated from a projection image generation unit in the projector 190, onto the first reflecting mirror 191. The projected image is reflected by the first and second reflecting mirrors 191 and 192 and is then formed on the rear of the transmissive screen 193, so that the image is displayed.

This type of rear projection display apparatus can be easily increased in size as compared with a television using a cathode-ray tube because the rear projection display apparatus has a smaller depth and a wider screen. Accordingly, the rear projection display apparatus is becoming widespread as a display of a home theater system. Japanese Unexamined Patent Application Publication No. 11-84533 discloses a rear projection display apparatus having a structure different from that shown in FIG. 35. This apparatus does not include a first reflecting mirror. An image is directly projected from a projection lens to a second reflecting mirror.

Since the rear projection display apparatuses are installed in homes in many cases, each apparatus needs a long-life and high-intensity lamp as a light source. The lamp will now be described.

FIGS. 36 and 37 show a lamp 200 which is generally used in a rear projection display apparatus. The lamp 200 has a light source (also called a burner) 201a, a reflector 202, and a transparent front plate 204. The light source 201a including a glass tube (bulb) filled with a discharge gas is disposed in a space enclosed by the reflector 202 and the transparent front plate 204 such that the light source 201a is isolated. Light emitted from the light source 201a is reflected to the transparent front plate 204 by the inner reflecting surface of the reflector 202. The reflected light is transmitted through the transparent front plate 204 such that the light serves as outgoing light of the lamp 200. In many cases, a curved reflecting surface for collimating the outgoing light as shown by solid arrows in FIG. 37 is used. Some of optical systems each use a curved reflecting surface for converging reflected light once and then diverging the light as shown by dashed arrows in FIG. 37.

Not only light but also a large amount of heat are radiate from the light source 201a, as shown in FIG. 37, of the lamp 200. From the viewpoint of the luminous efficiency and life span of the lamp, it is necessary that the temperature Tb of the light source 201a and the temperature Tc of a sealing portion 201b at one end of the bulb lie in a predetermined range.

For this purpose, a fan 210 is used to blow cold air onto the rear of the lamp 200 in order to cool the lamp 200 as shown in FIG. 36.

However, the intensity of the lamp 200 is increasing in response to requests to increase the brightness of images in the rear projection display apparatus, thus increasing the amount of heat to be exhausted. In the above-described indirect air cooling for the light source 201a and the sealing portion 201b in the lamp 200 whose exterior is blown with air as shown in FIG. 36, it is difficult to set the temperatures Tb and Tc in the predetermined range.

To solve the above problem, a direct air-cooling structure shown in FIG. 38 is proposed. In this structure, the top and bottom surfaces of the reflector 202 have openings 202a and 202b through which the interior space of the lamp is ventilated so that the light source 201a and the sealing portion 201b can be directly air-cooled. Japanese Unexamined Patent Application Publication No. 2003-157715 discloses such a direct air-cooling structure in which the direction of air blowing is opposite to that in the above-mentioned structure in FIG. 38.

SUMMARY OF THE INVENTION

In the structure of FIG. 38 in which external air is introduced into the interior space of the lamp where the light source 201a and the sealing portion 201b are arranged, the number of revolution of the fan 210 can be increased or a larger fan can be used in order to control the temperatures Tb and Tc in the predetermined range. In this case, unacceptable noise may be caused by air blowing, resulting in a reduction in the commercial value of the rear projection display apparatus.

Further, dirt and dust contained in external air may enter the interior space of the lamp and cut off light, thus reducing the amount of outgoing light of the lamp 200. This results in a decrease in intensity of the lamp 200. If the light source 201a bursts at the end of the life of the lamp 200, noise caused by the burst and/or fragments of the light source 201a may be leaked from the lamp 200.

According to an approach to reducing the installation area of the rear projection display apparatus, the reflecting mirror 192, which is arranged on the inner rear surface of the known rear projection display apparatus in FIG. 35, is disposed on the inner top surface and an image is projected from the projector substantially perpendicular to the reflecting mirror 192. Thus, the depth of the rear projection display apparatus can be further reduced.

In this arrangement in which the reflecting mirror, serving as a flat mirror, is arranged on the inner top surface of the display apparatus, it is more difficult to control the relative positional relation between the reflecting mirror and the screen than the foregoing known one. Accordingly, a new projection optical system exclusively designed for the above-described arrangement is used instead of the known projector 190 in FIG. 35. It is therefore necessary for users to easily perform fine adjustment of projected images in actual use.

In consideration of the above-described circumstances, it is desirable to provide a low-noise and highly-reliable lamp cooling device permitting easy adjustment of an image projected by a rear projection display apparatus in an installation location desired by a user and a rear projection display apparatus including the lamp cooling device.

According to an embodiment of the present invention, there is provided a lamp cooling device for cooling a lamp including a transparent front plate, a reflector that reflects light emitted from a light source to the transparent front plate, and the light source disposed in an interior space enclosed by the transparent front plate and the reflector. The lamp cooling device includes a closed pipe line through which a gas is circulated. The lamp has a gas intake opening and a gas exhaust opening, the openings communicating with the interior space. The pipe line is connected to both of the gas intake opening and the gas exhaust opening so as to include the interior space of the lamp. The pipe line includes a flexible portion connected to the gas intake opening and another flexible portion connected to the gas exhaust opening.

In accordance with this embodiment, in a case where a blower for forcibly producing a current of air circulated in the closed pipe line is connected to the pipe line including the interior space of the lamp, vibration caused by the blower is absorbed by the flexible portions in the pipe line. Thus, the life span of the light source of the lamp can be extended.

According to another embodiment of the present invention, there is provided a rear projection display apparatus including a cabinet, a lamp, a lamp cooling device, and an optical unit. The lamp includes a transparent front plate, a reflector reflecting light emitted from a light source to the transparent front plate, and the light source disposed in an interior space enclosed by the transparent front plate and the reflector. The optical unit includes a projection lens and a projection mirror. The lamp, the lamp cooling device, and the optical unit are arranged in the cabinet. The lamp cooling device includes a closed pipe line through which a gas is circulated. The lamp has a gas intake opening and a gas exhaust opening, the openings communicating with the interior space of the lamp. The pipe line is connected to the gas intake opening and the gas exhaust opening so as to include the interior space of the lamp. The pipe line includes a flexible portion connected to the gas intake opening and another flexible portion connected to the gas exhaust opening. The lamp cooling device further includes a blower that forcibly circulates the gas in the closed pipe line, and a cooler that cools the gas circulated in the closed pipe line. The lamp is positioned so as to be integrally connected to the optical unit. The blower and the cooler are fixed to the cabinet.

In accordance with this embodiment, since the lamp is positioned so as to be integrally connected to the optical unit, the position of the light source and the relative positional relation between the light source and the optical unit are not changed during adjustment of the optical unit. In addition, since the blower and the cooler are fixed to the cabinet of the display apparatus and are connected to the lamp through the flexible portions of the pile lines, vibration caused by the blower can be absorbed by the flexible portions, thus extending the life span of the lamp. Since the lamp alone can be moved independent of the blower, the optical unit can be easily adjusted.

In the lamp cooling device and the rear projection display apparatus according to the above-described embodiments of the present invention, the position of the lamp can be easily adjusted independent of the blower because the lamp and the blower are connected to the pipe line including the flexible portions.

BRIEF DESCRIPTION OF THE DRAWINGS

FIG. 6 is a perspective view of the rear of a frame assembly alone of the display unit in FIG. 5;

FIGS. 11A to 11D show cross sections of the four frame segments in FIG. 10, FIG. 11A being a cross-sectional view of a top frame segment, FIG. 11B being a cross-sectional view of a left frame segment, FIG. 11C being a cross-sectional view of a right frame segment, FIG. 11D being a cross-sectional view of a bottom frame segment;

DESCRIPTION OF THE PREFERRED EMBODIMENTS

An embodiment of the present invention will now be described with reference to FIGS. 1 to 33.

Figure 1:
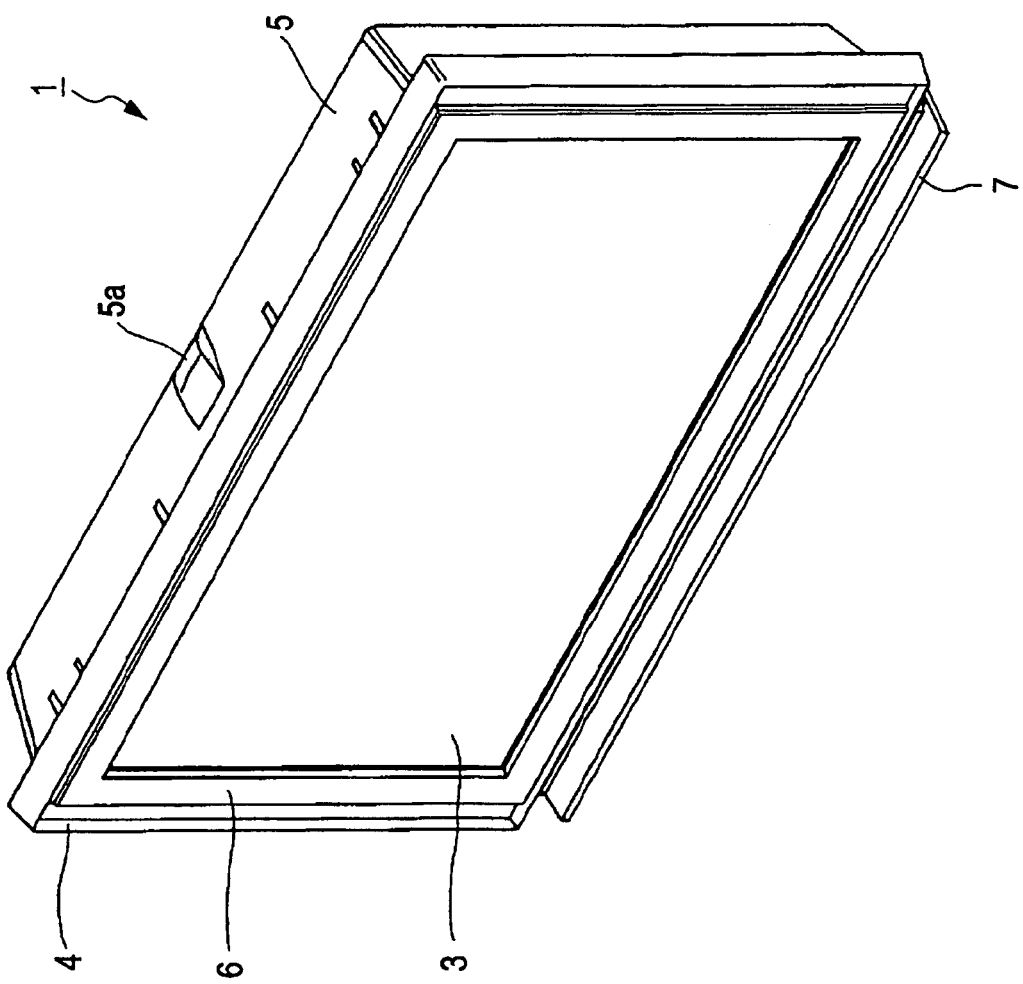
FIG. 1 is a perspective view of the front of a rear projection display apparatus in accordance with an embodiment of the present invention.
Figure 2:
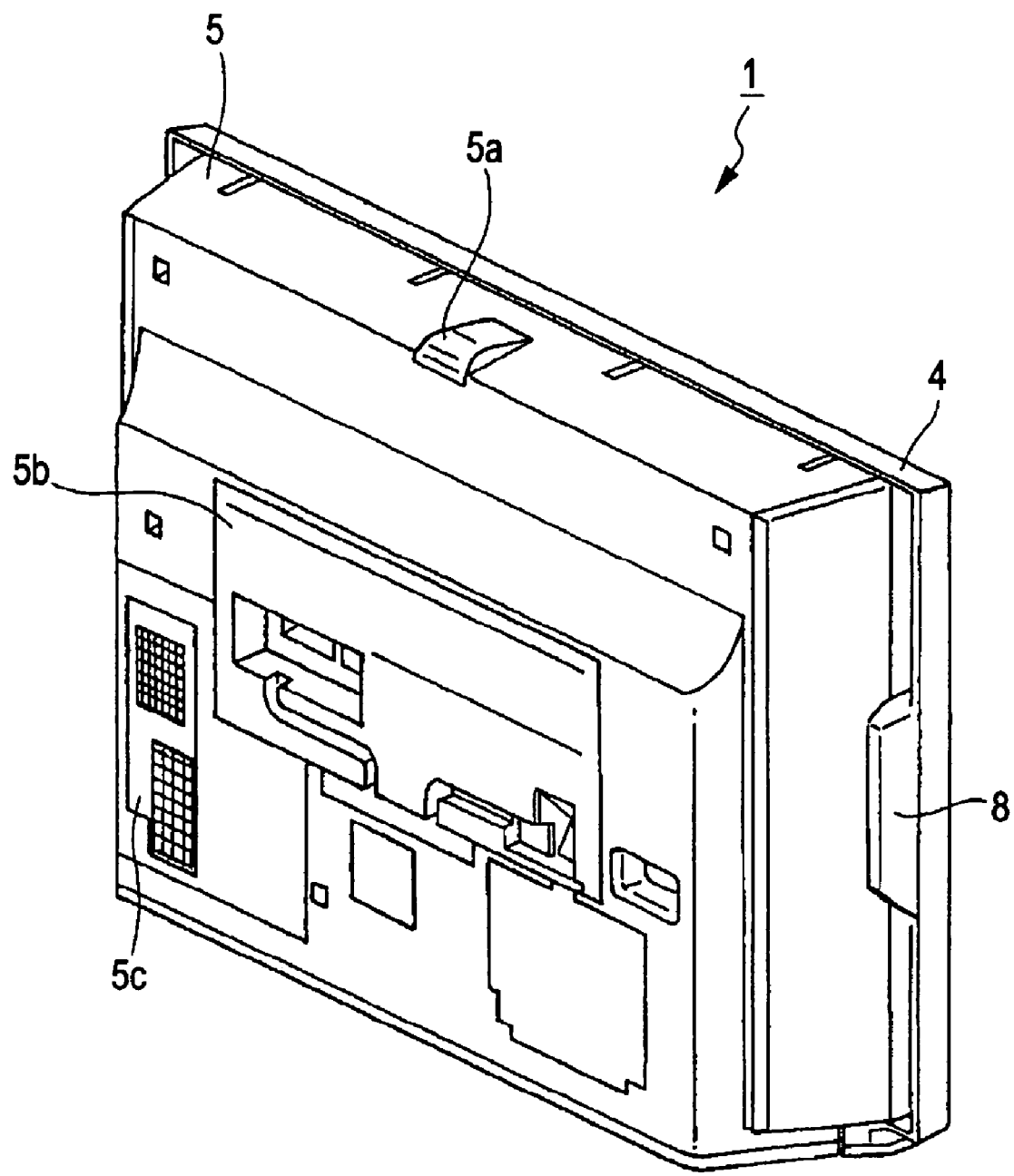
FIG. 2 is a perspective view of the rear of the rear projection display apparatus of FIG. 1.
Figure 3:
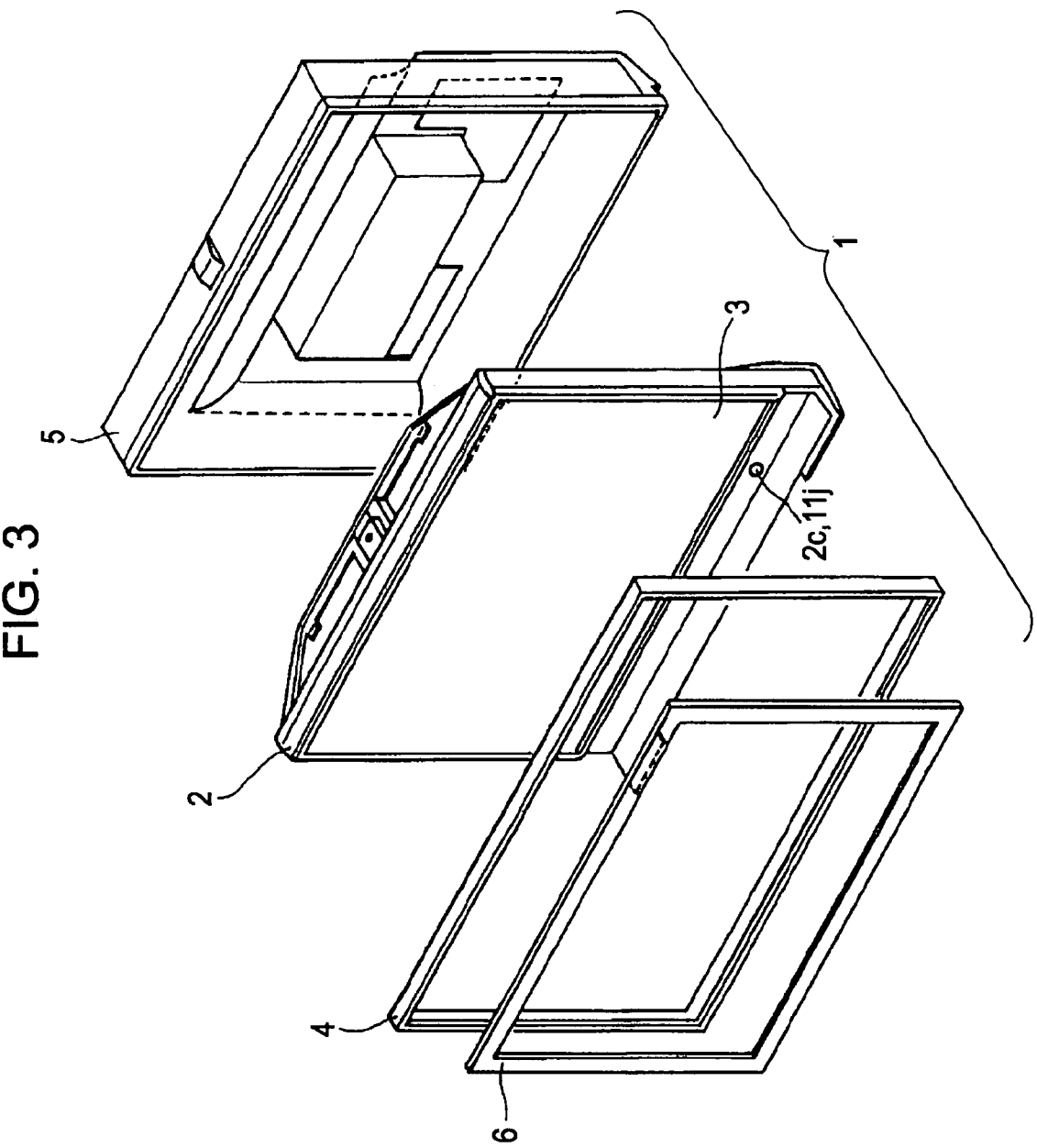
FIG. 3 is an exploded perspective view thereof as viewed from the front side.

FIG. 1 is a perspective view of a rear projection display apparatus 1 according to the present embodiment as viewed from the front side of the apparatus. FIG. 2 is a perspective view of the rear projection display apparatus 1 as viewed from the rear side. FIG. 3 is an exploded perspective view showing the schematic structure of the rear projection display apparatus 1.

In the present embodiment, the rear projection display apparatus 1 has, for example, a 50-inch diagonal screen and has a depth of 30 cm, which is thin.

Referring to FIG. 3, the rear projection display apparatus 1 includes a display unit 2, an outer frame 4, a cover frame 6, and a rear cover 5. The display unit 2 has a rear projection screen 3 on the front thereof. The cover frame 6 and the outer frame 4 are attached to the front of the display unit 2. The rear cover 5 is attached to the rear of the display unit 2. In this instance, the outer frame 4, the cover frame 6, and the rear cover 5 constitute a cabinet of the rear projection display apparatus 1.

The screen 3 includes a front transparent glass plate and a rear transparent glass plate which are arranged at a predetermined distance. The front surface of the front transparent glass plate is matted and the rear surface thereof is covered with a lenticular sheet. The rear surface of the rear transparent glass plate is covered with a Fresnel lens sheet.

Referring to FIG. 1, the rectangular cover frame 6 is arranged on the ends of the screen 3 in the front of the display unit 2 and the rectangular outer frame 4 is arranged on the cover frame 6. Referring to FIG. 2, the rear of the display unit 2 is covered with the rear cover 5.

Referring to FIG. 1, the rear projection display apparatus 1 has a foot cover 7. Referring to FIG. 3, the display unit 2 has an adjustment hole 2c in the lower front portion thereof. The adjustment hole 2c serves as a hole 11j through which an adjusting screw for positional adjustment of an optical unit 50, which will be described later, is inserted. In this description, a hole through which a screw is inserted will be termed a screw insertion hole.

Referring to FIG. 2, the rear cover 5, which is arranged on the rear of the rear projection display apparatus 1, includes a mirror adjustment lid 5a, a recessed cover 5b, and a fan cover 5c. The mirror adjustment lid 5a is arranged in an upper portion of the rear cover 5. The cover 5b receives an electric circuit unit (not shown). The fan cover 5c is arranged so as to correspond to an air cooling fan unit 57 (refer to FIG. 5) for cooling a radiator 100 arranged in a lamp housing 58 of the display unit 2. The radiator 100 will be described later.

In order to adjust a projection mirror 30, the mirror adjustment lid 5a is opened to expose a mirror holding plate 34. The projection mirror 30 and the mirror holding plate 34 will be described below. The radiator 100 cools heated air, which has been blown against a lamp 90, by heat exchange with lower temperature air. The lamp 90 will be described below.

Referring to FIG. 2, a speaker unit 8 having a decorative panel on its front surface is arranged in a vertically long area defined between each side of the outer frame 4 and the associated side of the rear cover 5.

The display unit 2 in FIG. 3 will now be described with reference to FIGS. 4 to 9.

Figure 4:
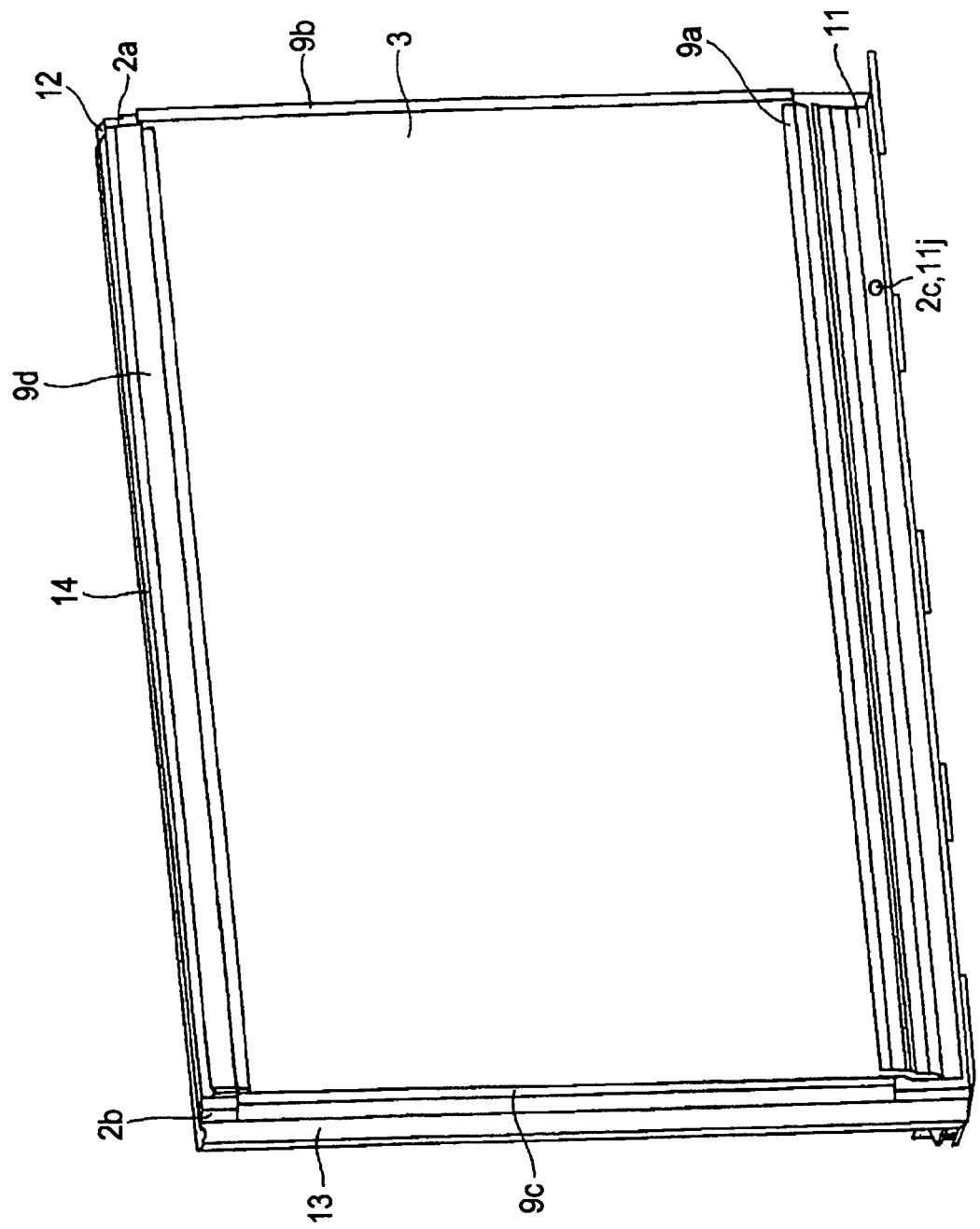
FIG. 4 is a perspective view of the front of a display unit in FIG. 3.
Figure 5:
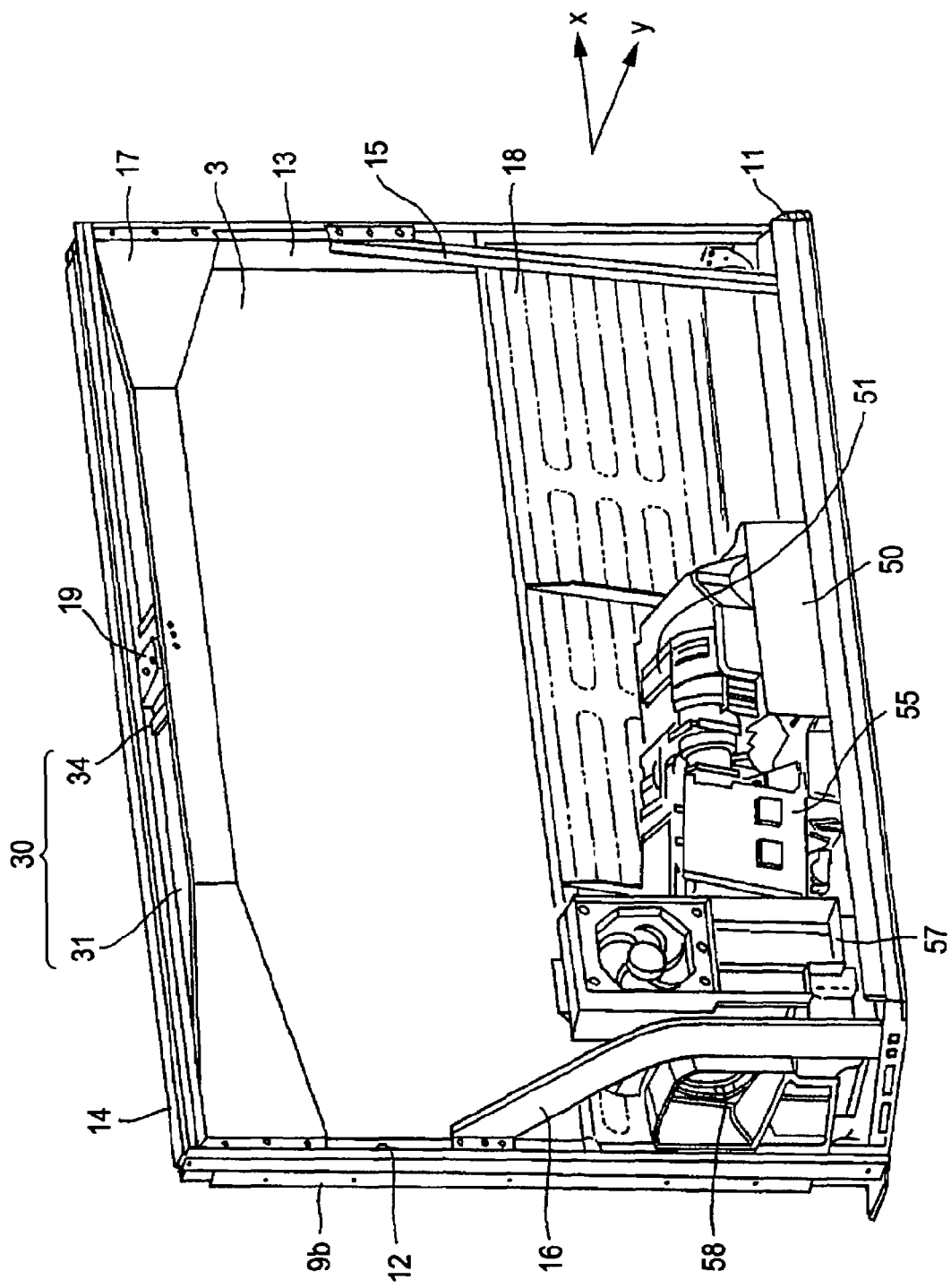
FIG. 5 is a perspective view of the rear of the display unit in FIG. 3.

FIG. 4 is a perspective view of the front of the display unit 2. FIG. 5 is a perspective view of the rear of the display unit 2. FIG. 6 is a perspective view of the rear of a frame assembly of the display unit 2.

Referring to FIG. 4, the display unit 2 includes a horizontally long bottom frame segment 11, a left frame segment 12, a right frame segment 13, and a top frame segment 14. The left and right frame segments 12 and 13 stand from both sides of the bottom frame segment 11. The top frame segment 14 is arranged on the top ends of the left and right frame segments 12 and 13. Those frame segments constitute a substantially rectangular frame in which the screen 3 is disposed. Four screen retainers 9a, 9b, 9c, and 9d retain the ends of the screen 3 so that the screen 3 is not detached from the frame. Mirror shaft bearings 2a and 2b are engaged with shafts 38a which extend from shaft pieces 38 arranged in the projection mirror 30.

In the display unit 2, referring to FIG. 5, the optical unit 50 is disposed on the bottom frame segment 11. The optical unit 50 includes the lamp housing 58 and the air cooling fan unit 57. The optical unit 50 splits lamp light into three primary color components of red (R), green (G), and blue (B), generates three color images through three liquid crystal display panels (not shown); combines the images into an image, and projects the image through a projection window 51. In the present embodiment, reflective liquid crystal display panels are used as the three liquid crystal display panels. The optical unit 50 further includes a circuit board 55 for projection control. The circuit board 55 controls images of the three liquid crystal display panels built in the optical unit 50.

The display unit 2 further includes a left frame support 16 and a right frame support 15 on the rear side as shown in FIG. 5. The left frame support 16 is arranged between the left frame segment 12 and the bottom frame segment 11. The right frame support 15 is disposed between the right frame segment 13 and the bottom frame segment 11. The display unit 2 further includes a light shielding plate 18 for preventing light leaked from the optical unit 50 from affecting the screen 3. The light shielding plate 18 is also used for reinforcement of the screen 3.

The display unit 2 has a mirror support 17 made of a bended metal sheet. The mirror support 17 is attached to upper end portions of the left and right frame segments 12 and 13 as shown in FIG. 5. The mirror support 17 is bent such that the combination of the mirror support 17 with the top frame segment 14 has a trapezoidal shape as viewed from above. A mirror fixing plate 19 is arranged between substantially central portions of the top frame segment 14 and the mirror support 17 as shown in FIG. 6. As will be described below, the mirror holding plate 34 is engaged with the mirror fixing plate 19, thus positioning and fixing the projection mirror 30 shown in FIGS. 7A and 7B.

The principle of image projection onto the screen 3 of the display unit 2 with the above-described structure will now be described.

Figure 8:
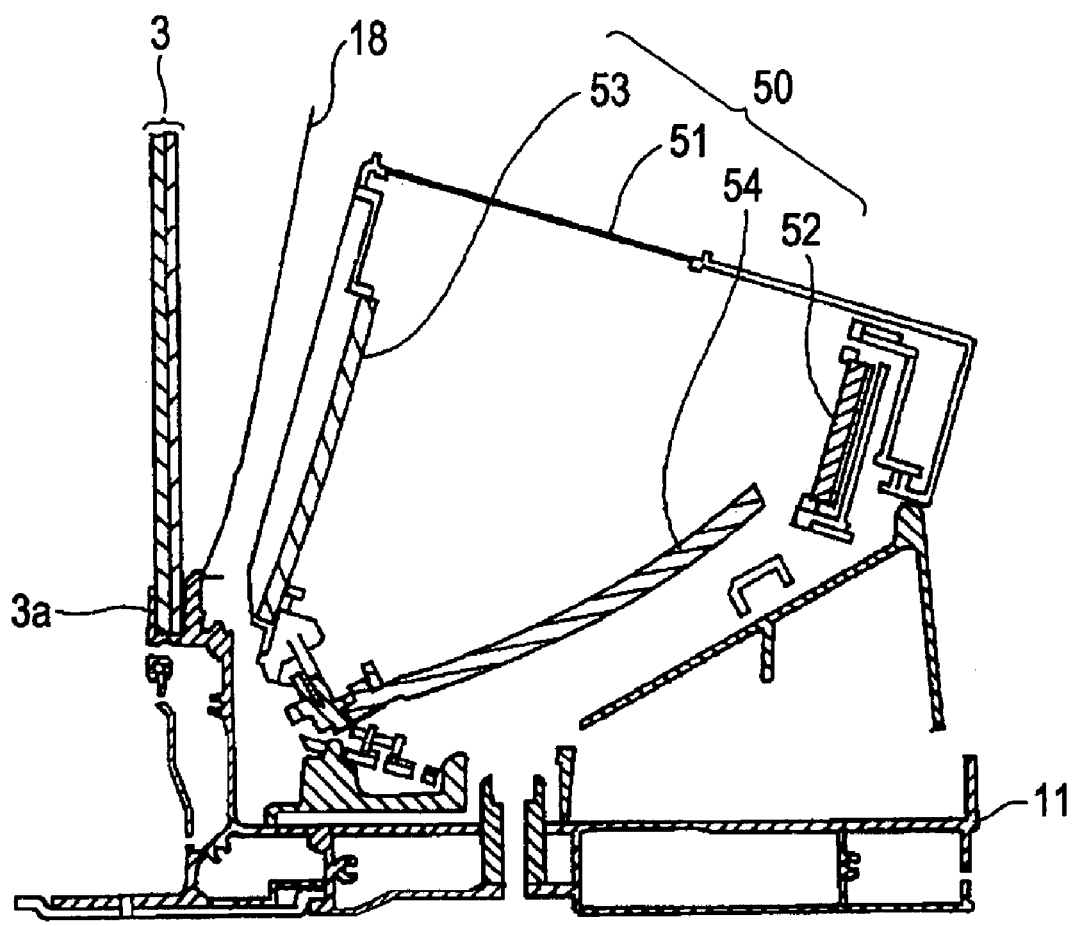
FIG. 8 is a cross-sectional view of an optical unit in FIG. 5 taken along a line passing through the longitudinal axis of a projection window.
Figure 9:
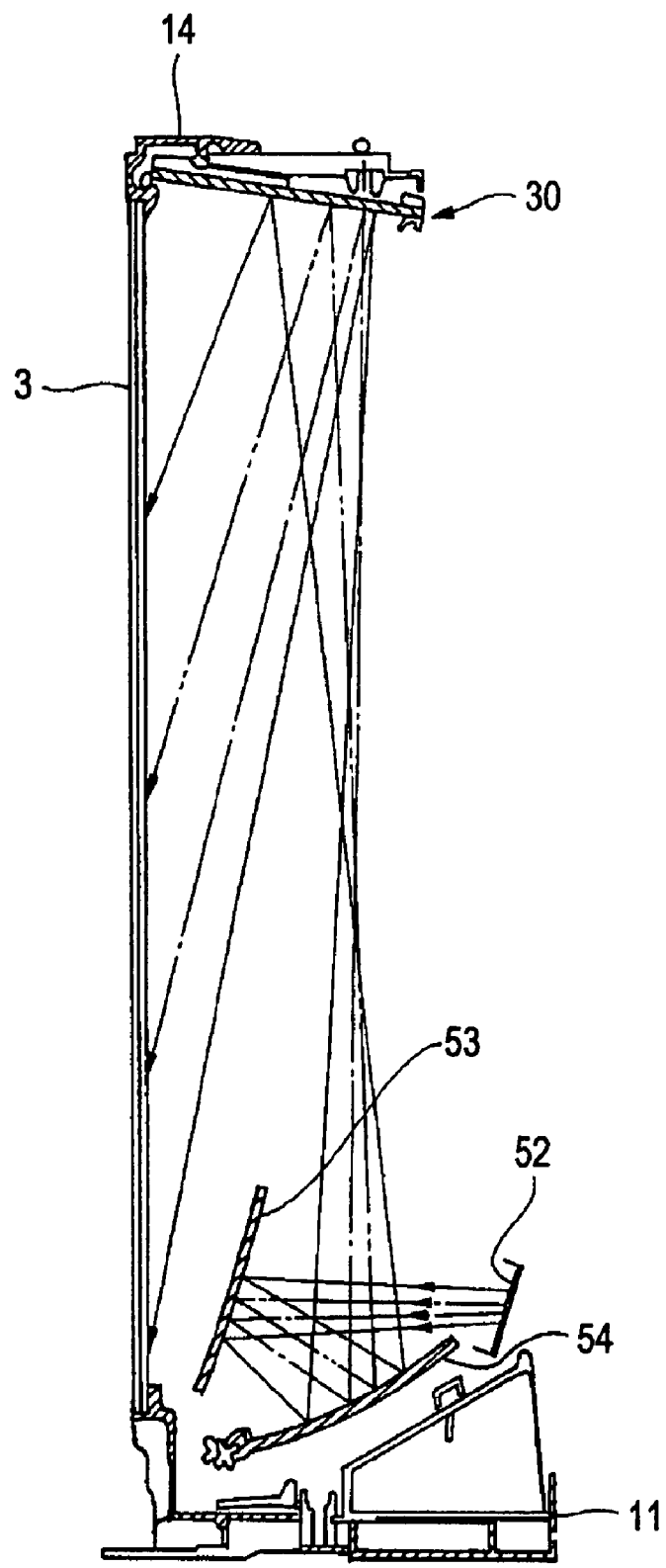
FIG. 9 is a diagram explaining an example of the optical path of an image projected in the rear projection display apparatus in accordance with the embodiment of the present invention.

FIG. 8 is a cross-sectional view of the optical unit 50 taken along a line passing through the longitudinal axis of the projection window 51 shown in FIG. 5. R, G, and B optical images generated through the above-described three liquid crystal display panels are combined into one optical image and the image is projected to a flat mirror 52. The projected image is reflected to a convex mirror 53 by the flat mirror 52 such that the optical path of the projected image is bent at about 90°. Referring to FIG. 9 which shows the whole optical path, the image light reflected by the convex mirror 53 is further reflected by an aspherical mirror 54. The reflected light passes through the projection window 51 and is then reflected by a flat mirror 31 of the projection mirror 30, so that the reflected light is projected onto the screen 3.

The flat mirror 52, the convex mirror 53, and the aspherical mirror 54 constitute a projection mirror mechanism.

In the display unit 2 according to the present embodiment, the ratio of the height of the display unit 2 to the depth thereof, i.e., the distance from the screen 3 disposed in the front of the display unit 2 to the flat mirror 52 in the optical unit 50 is about 10:3 as shown in FIG. 9. The height of the display unit 2 is much longer than the depth thereof and the angle which the direction of projection to the flat mirror 52 forms with the horizontal direction is remarkably larger than that in a known rear projection display apparatus.

Accordingly, the slight deformation of the frame assembly shown in FIG. 6 will cause distortion or blur of an image projected on the screen 3. In the display unit 2 in accordance with the present embodiment, it is therefore necessary to easily perform fine adjustment of an image projected on the screen 3 after the rear projection display apparatus 1 is moved to an installation location which a user desires.

In each of recent rear projection display apparatuses, the intensity of a lamp is improved, i.e., the power of the lamp is increased so that a projected image is easily viewable even if lighting in a room is relatively bright. The display unit 2 in the present embodiment, therefore, includes a lamp cooling device in the cabinet. The lamp cooling device includes a radiator, serving as a cooler for cooling air heated by a lamp, and a blower for providing forced circulation of the air.

The frame assembly of the display unit 2 in the present embodiment, the projection mirror 30, the optical unit 50, and the lamp cooling device for cooling the lamp provided for the optical unit 50 with air will sequentially be described below.

The frame assembly of the display unit 2 in the present embodiment will now be described with reference to FIGS. 1, 4, 6, 10 to 15, and 24.

Figure 10:
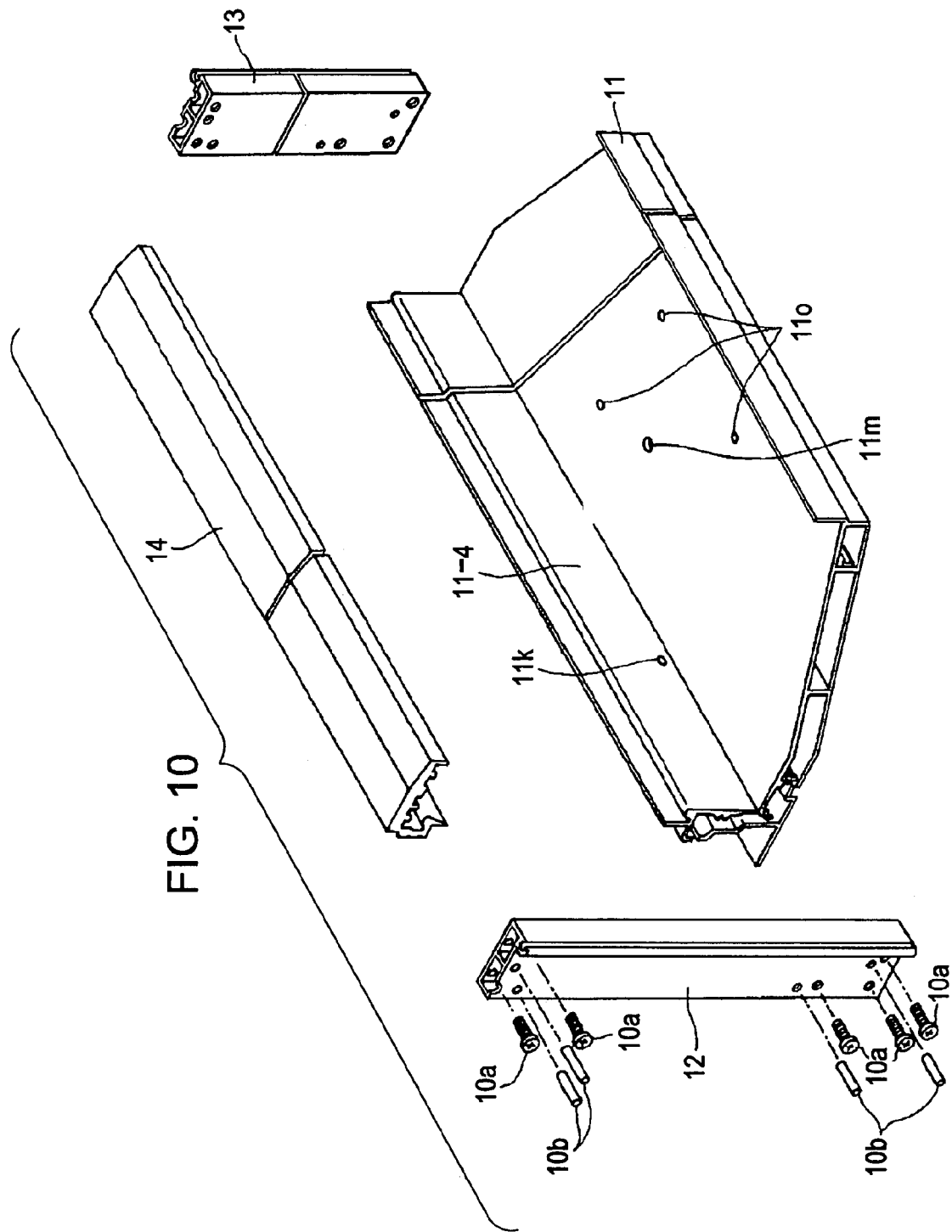
FIG. 10 is a partially cutaway perspective view of four frame segments constituting a screen frame included in the frame assembly of FIG. 6.

FIG. 10 is a perspective view showing the bottom frame segment 11, the left and right frame segments 12 and 13, and the top frame segment 14 included in the frame assembly of FIG. 6, those frame segments being partially not shown. FIGS. 11A to 11D show cross sections of the respective frame segments. Specifically, FIG. 11A is a cross-sectional view of the top frame segment 14, FIG. 11B is a cross-sectional view of the left frame segment 12, FIG. 11C is a cross-sectional view of the right frame segment 13, and FIG. 11D is a cross-sectional view of the bottom frame segment 11.

Those frame segments 11 to 14 are each formed in a rod or plate shape by extruding, for example, aluminum alloy from dies such that the frame segments have uniform cross sections as shown in FIGS. 10 and 11A to 11D. The left and right frame segments 12 and 13 are made by the same die.

Referring to FIG. 11D, the bottom frame segment 11 has a substantially L-shaped cross section. The L-shaped cross section is divided into five space regions A, B, C, D, and E, each of which is shaped in a substantially rectangle by partition walls. The four space regions A to D correspond to the bottom part of the L-shaped cross section and the space region E corresponds to the rising part thereof. Four threaded grooves 11a, 11b, 11c, and 11d are integrally formed in the bottom frame segment 11 as shown in FIG. 11D. Each of the threaded grooves 11a to 11d has a substantially circular cross section. A fixing screw 10a, which will be described later, is inserted through each of the threaded grooves 11a, 11b, 11c, and 11d. A plate-shaped protrusion 11e extends from a surface 11-1, which is close to the space region E, perpendicular to the surface 11-1 in FIG. 11D. The screen 3 is disposed on the surface 11-1 and a surface 11-2 of the protrusion 11e.

In the cross section of the bottom frame segment 11, the partition walls include thick parts 11h and 11i. A plate-shaped part 11f extends from a left portion adjacent to the space region D in the bottom frame segment 11 in FIG. 11D. As will be described later, spring pins 10b for positioning the left and right frame segments 12 and 13 are arranged in the thick parts 11h and 11i, respectively. The plate-shaped part 11f serves as a foot and is covered with the foot cover 7 as shown in FIG. 1.

Referring to FIG. 11D, a lower portion of a side wall 11-4 adjacent to the space region E has a screw insertion hole 11k for an adjusting screw 82 for the optical unit 50. The adjusting screw 82 will be described later. Similarly, another side wall 11-5 has the screw insertion hole 11j for the adjusting screw 82 (see FIGS. 6 and 10). The diameter of the screw insertion hole 11j is larger than that of the head of the adjusting screw 82. The diameter of the screw insertion hole 11k is larger than that of the thread of the adjusting screw 82 and is smaller than that of the head thereof. The screw insertion holes 11j and 11k are arranged such that the respective centers of the holes 11j and 11k are substantially aligned with each other.

A surface 11-3 in the region C in FIG. 11D has a locating hole 11m (refer to FIGS. 6 and 10) and a bottom wall 11-6 has a threaded hole 11n such that the locating hole 11m is opposite the threaded hole 11n. As will be described below, a rotating shaft 70 is fitted into the locating hole 11m (refer to FIG. 24). The rotating shaft 70 serves as a reference of rotation of the optical unit 50.

Figure 24:
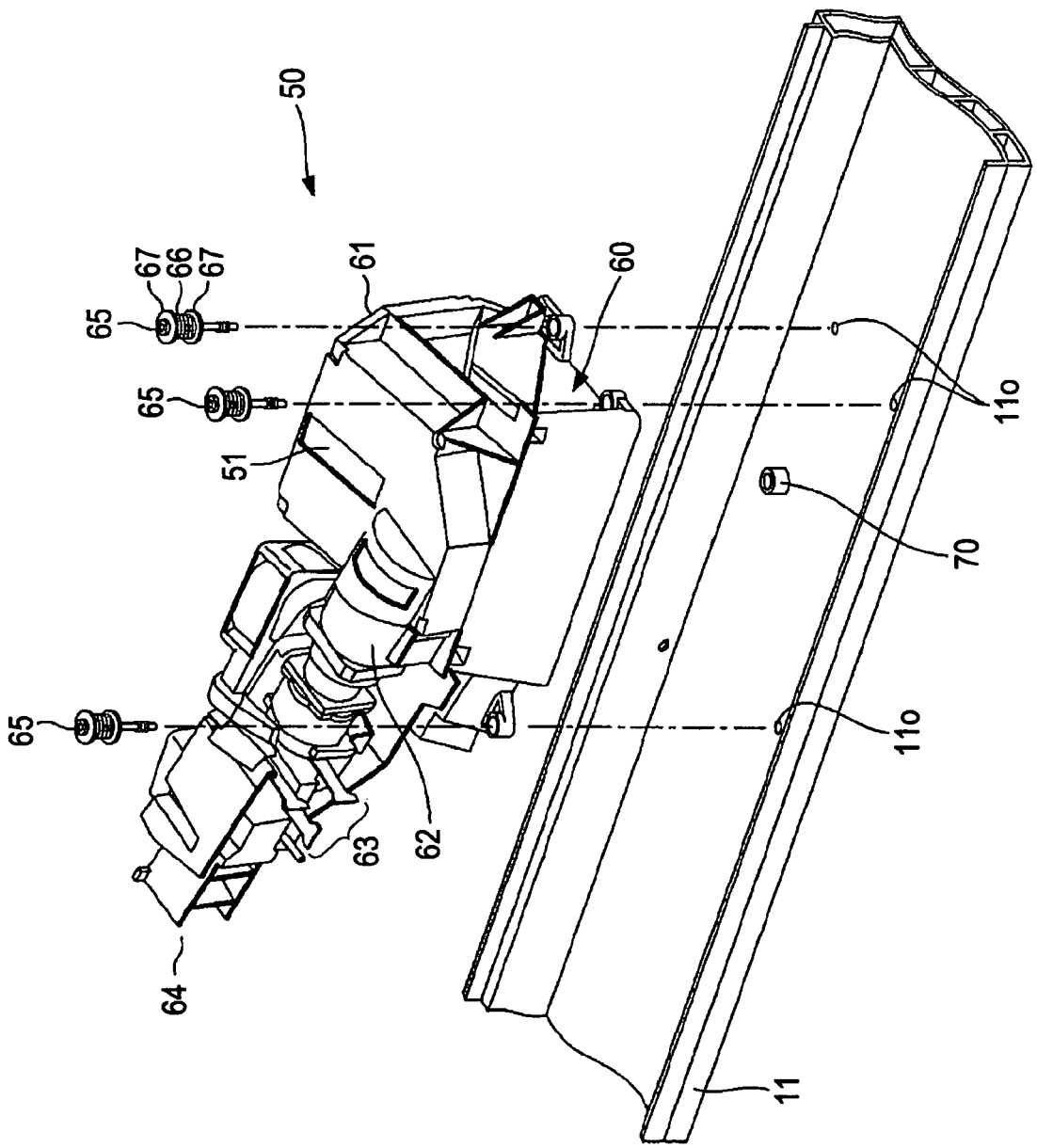
FIG. 24 is a perspective view of the optical unit of the rear projection display apparatus in accordance with the embodiment of the present invention, FIG. 24 explaining attachment of the optical unit to the bottom frame segment.

Referring to FIG. 24, three threaded holes 11o are arranged around the locating hole 11m in the surface 11-3. The three threaded holes 11o are used for attachment of the optical unit 50 to the surface 11-3 of the bottom frame segment 11.

Referring to FIG. 11B, the left frame segment 12 has a substantially rectangular cross section. The cross section is divided into two space regions F and G by a partition wall located at substantially the middle of the cross section. The left frame segment 12 has a groove 12a in a surface such that the groove 12a protrudes into the region F. The left frame segment 12 further has a groove 12b in the vicinity of the region G. The groove 12b has a substantially circular cross section. Referring to FIG. 10, the left frame segment 12 has two screw insertion holes for the fixing screws 10a and two pin insertion holes, each of which the spring pin 10b is inserted, such that those holes are located in an upper portion of the segment 12 and further has three screw insertion holes for the fixing screws 10a and two pin insertion holes for the spring pins 10b such that those holes are located in a lower portion thereof.

The two screw insertion holes for the fixing screws 10a in the upper portion of the left frame segment 12 are located so as to correspond to threaded grooves 14b and 14c of the top frame segment 14, respectively, and the two pin insertion holes for the spring pins 10b are located so as to correspond to thick parts 14d and 14e of the top frame segment 14, respectively (see FIG. 11A). The top frame segment 14 will be described later.

The three screw insertion holes for the fixing screws 10a in the lower portion are located so as to correspond to the threaded grooves 11b, 11c, and 11d of the bottom frame segment 11, respectively, and the two pin insertion holes for the spring pins 10b are located so as to correspond to the thick parts 11h and 11i of the bottom frame segment 11, respectively (refer to FIG. 11D).

Referring to FIG. 11c, the right frame segment 13 has a substantially rectangular cross section similar to the left frame segment 12. The cross section is divided into two space regions F' and G' by a partition wall located at substantially the middle of the cross section. The right frame segment 13 has a groove 13a in a surface such that the groove 13a protrudes into the region F'. The right frame segment 13 further has a groove 13b in the vicinity of the region G'. Five screw insertion holes for screws and four pin insertion holes for spring pins are arranged in predetermined positions, respectively.

Figure 15:
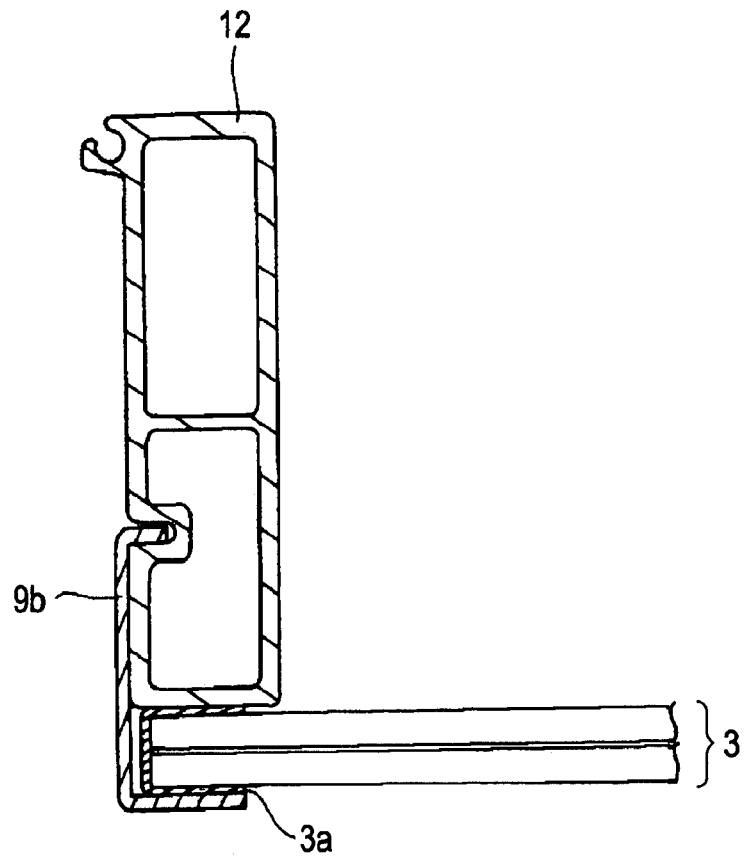
FIG. 15 is a cross-sectional view of a screen in FIG. 4 attached to the left frame segment.

As will be described below with reference to FIG. 15, bent parts arranged in one longitudinal sides of the above-described left and right screen retainers 9b and 9c shown in FIG. 4 are fitted into the grooves 12a and 13a of the left and right frame segments 12 and 13, respectively. The grooves 12b and 13b are used for attachment of a seal made of flexible resin foam.

As shown in FIGS. 10 and 11A, the top frame segment 14 has a substantially inverted L-shaped cross section. The threaded grooves 14b and 14c for the fixing screws 10a are arranged in the lower surface of a substantially horizontally held portion of the top frame segment 14. The threaded grooves 14b and 14c each have a substantially circular cross section. Referring to FIG. 11A, a portion extending downwardly from one end of the above horizontally held portion has a surface 14-1 and a surface 14-2, which is orthogonal to the surface 14-1. The downwardly extending portion further has a protrusion 14f having a substantially triangular cross section. The protrusion 14f extends vertically in FIG. 11A and has a surface 14-3 that is orthogonal to the surface 14-2. The screen 3 is arranged in contact with the surface 14-3 of the protrusion 14f.

The top frame segment 14 further includes the thick parts 14d and 14e and has a groove 14a having a circular cross section on the protrusion 14f. The groove 14a serves as a sliding surface in which one end of the projection mirror 30 is slid such that the projection mirror 30 is pivotable. The spring pins 10b for positioning the left and right frame segments 12 and 13 are arranged in the thick parts 14d and 14e.

Figure 12:
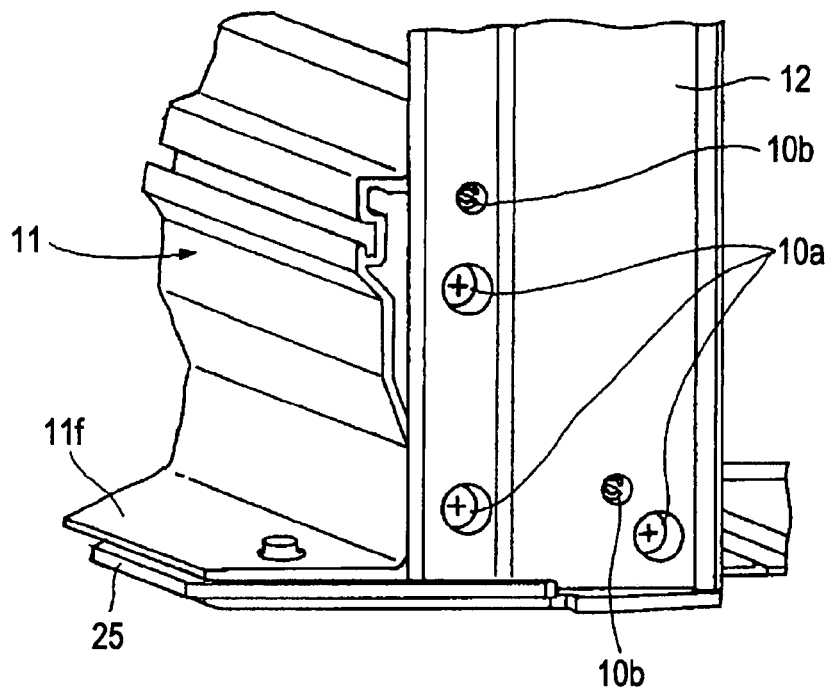
FIG. 12 is a perspective view showing a state in which the left frame segment is positioned and fixed to the bottom frame segment in the frame assembly of FIG. 6.
Figure 13:
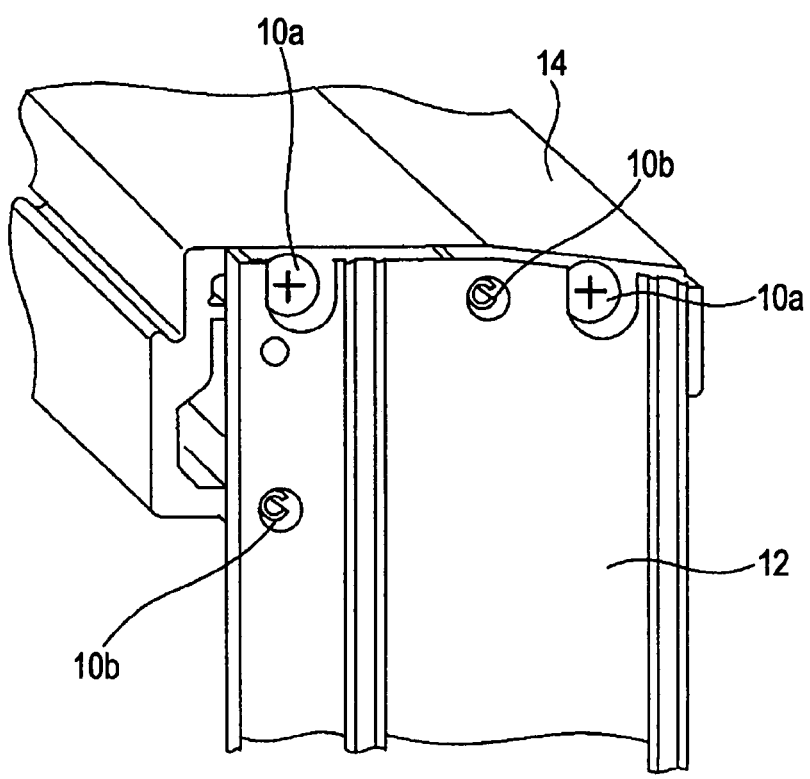
FIG. 13 is a perspective view showing a state in which the left frame segment is positioned and fixed to the top frame segment in the frame assembly of FIG. 6.

To assemble the frame segments 11, 12, 13, and 14 having the above-described structures, the fixing screws 10a are screwed into the threaded grooves 11b, 11c, and 11d of the bottom frame segment 11 shown in FIG. 10 through the three screw insertion holes in the lower portion of the left frame segment 12 and the three screw insertion holes in the lower portion of the right frame segment 13, respectively, thus temporarily fixing the bottom frame segment 11 to the left and right frame segments 12 and 13 (see FIG. 12). Further, the fixing screws 10a are screwed into the threaded grooves 14b and 14c of the top frame segment 14 through the two screw insertion holes in the upper portion of the left frame segment 12 and the two screw insertion holes in the upper portion of the right frame segment 13, respectively, thus temporarily fixing the top frame segment 14 to the left and right frame segments 12 and 13 (refer to FIG. 13).

Figure 14:
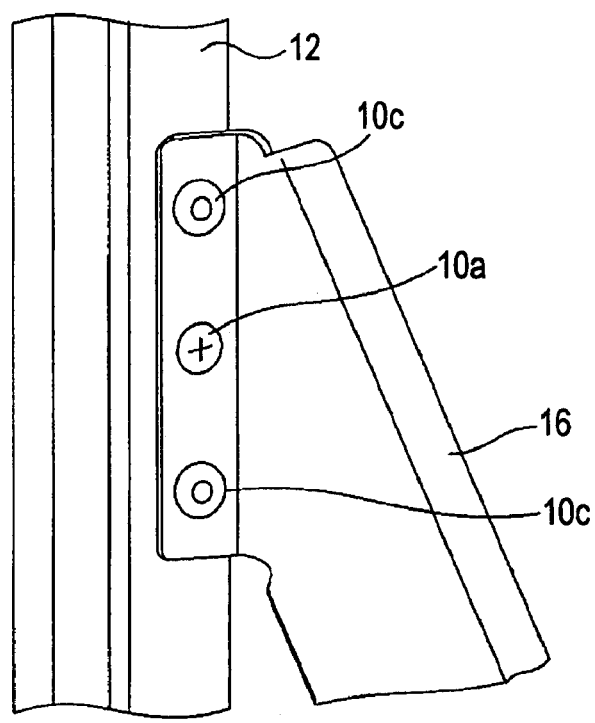
FIG. 14 is a perspective view of a left frame support connected to the left frame segment and the bottom frame segment so that the frame assembly of FIG. 6 is braced with the left frame support, FIG. 14 showing a connection state of the left frame support to the left frame segment.

Referring to FIG. 6, the right frame support 15 is temporarily fixed to the bottom frame segment 11 and the right frame segment 13 in a bracing manner using the fixing screws 10a and the left frame support 16 is temporarily fixed to the bottom frame segment 11 and the left frame segment 12 using the fixing screws 10a in a bracing manner (refer to FIG. 14).

In this instance, the right and left frame supports 15 and 16 are arranged such that each frame support forms an angle of about 45° with the top frame segment 14, as viewed from above of the display unit 2. After complete fixing, the right and left frame supports 15 and 16 increase the rigidity of the frame assembly against deforming force in the X direction and that in the Y direction shown in FIG. 5.

As described above, the frame segments 11, 12, 13, and 14 are assembled into a substantially rectangular screen frame on which the screen 3 is attached. The right and left frame supports 15 and 16 are fixed to the screen frame so as to support the screen frame.

Referring to FIG. 12, a foot plate 25 is disposed under the plate-shaped part 11f of the bottom frame segment 11. The foot plate 25 is a metal sheet for attachment of the foot cover 7 shown in FIG. 1.

The screen frame of the above-described frame assembly, including the temporarily fixed frame segments 11, 12, 13, and 14 and the right and left frame supports 15 and 16, is completely fixed using the fixing screws 10a and, for example, an assembly jig (not shown) such that the left and right frame segments 12 and 13 are perpendicular to the surface 11-3 of the bottom frame segment 11 in FIG. 6, and the surface 11-2 of the bottom frame segment 11 in FIG. 11D, the surface 12-1 of the left frame segment 12 in FIG. 11B, the surface 13-1 of the right frame segment 13 in FIG. 1C, and the surface 14-1 of the top frame segment 14 in FIG. 11A are flush with one another.

In order to keep the complete fixing state even if the fixing screws 10a are loosened, holes are drilled in the thick parts 11h and 11i of the bottom frame segment 11 and the thick parts 14d and 14e of the top frame segment 14 through the four pin insertion holes for the spring pins in the upper and lower portions of each of the left and right frame segments 12 and 13 such that the diameter of each hole is larger than the original diameter of the corresponding pin insertion hole.

After that, the bottom frame segment 11 and the top frame segment 14 are tightly fixed to the left and right frame segments 12 and 13 by the spring pins 10b fitted in the holes in the thick parts 11h, 11i, 14d, and 14e. In drilling the holes for arrangement of the spring pins 10b, a drill having a diameter larger than the original diameter of each of the pin insertion holes for the spring pins is used so that the diameter of each pin insertion hole for the spring pin after drilling is the same as that of the drilled hole in each of the thick parts 11h, 11i, 14d, and 14e, thus preventing the clearance between the spring pins 10b in the respective holes and the left and right frame segments 12 and 13.

In order to minimize the deformation of the screen frame even if a large force is applied to the whole of the frame, the right and left frame supports 15 and 16 are secured to the frame using rivets 10c as shown in FIG. 14 so that the frame is braced with the respective frame supports. The reason why the right and left frame supports 15 and 16 are not secured by screws is as follows: Since the right and left frame supports 15 and 16 are fixed to relatively thin wall surfaces of the frame segments 11, 12, and 13, each of which is formed of an extruded material, the joint strength between each frame support and each of the frame segments using only screws is insufficient under the application of a large deforming force.

Referring to FIGS. 6 and 8, the light shielding plate 18 is arranged in the lower portion of the screen frame composed of the frame segments 11 to 14. The light shielding plate 18 cuts off light leaked to the screen and serves as a reinforcing plate for preventing the deformation of the screen frame in the directions shown by the arrows in FIG. 5. The light shielding plate 18 is formed of a relatively thin metal sheet. In order to increase the rigidity, the light shielding plate 18 has a plurality of elongated recesses as shown in FIG. 6 and the upper and lower ends of the light shielding plate 18 are folded.

As described above, the mirror support 17 is fixed to the upper portions of the left and right frame segments 12 and 13 and the mirror fixing plate 19 is arranged between the top frame segment 14 and the mirror support 17.

In this manner, the frame assembly of the display unit 2 in the present embodiment is constructed.

In the frame assembly in the rear projection display apparatus according to the present embodiment, the screen frame to which the screen 3 is fixed is composed of the bottom frame segment 11, the left and right frame segments 12 and 13, and the top frame segment 14, each of which is light and has high rigidity and a uniform cross section because it is formed of an extruded metallic material of, for example, aluminum alloy. In assembling the frame segments into the screen frame, the fixing screws 10a are screwed into the threaded grooves 11a, 11b, 11c, and 11d of the bottom frame segment 11 and the threaded grooves 14b and 14c of the top frame segment 14, respectively. The spring pins 10b are arranged in the thick parts 11h and 11i of the bottom frame segment 11 and the thick parts 14d and 14e of the top frame segment 14, respectively. Thus, the screen frame is constructed with high accuracy without looseness.

To prevent the deformation of the screen frame, the right frame support 15 is fixed to the bottom frame segment 11 and the right frame segment 13 and the left frame support 16 is fixed to the bottom frame segment 11 and the left frame segment 12 such that the frame segments are braced with the frame supports, thus reinforcing the frame assembly.

The screen 3 is positioned by the surfaces 11-1 and 11-2 (refer to FIG. 11D) of the bottom frame segment 11 and the surface 14-3 (see FIG. 11A) of the top frame segment 14, the segments 11 and 14 constituting the screen frame. The screen 3 is retained by the screen retainers 9a, 9b, 9c, and 9d. A shock absorbing sheet 3a is arranged around the screen 3 (refer to FIG. 15).

The mirror support 17 having the mirror fixing plate 19 (FIG. 6) in substantially the middle thereof is arranged to the upper portions of the left and right frame segments 12 and 13 so that the positioning precision of the projection mirror 30 is kept, thus ensuring the rigidity of the screen frame. The projection mirror 30 is arranged such that one end of the projection mirror 30 is rotatable in the groove 14a (see FIG. 11A) of the top frame segment 14 and the other end thereof forms a predetermined angle with the mirror holding plate 34 (FIG. 7A) for the projection mirror 30.

A structure for attachment of the projection mirror 30 to the frame will now be described with reference to FIGS. 16 to 18.

Figure 16:
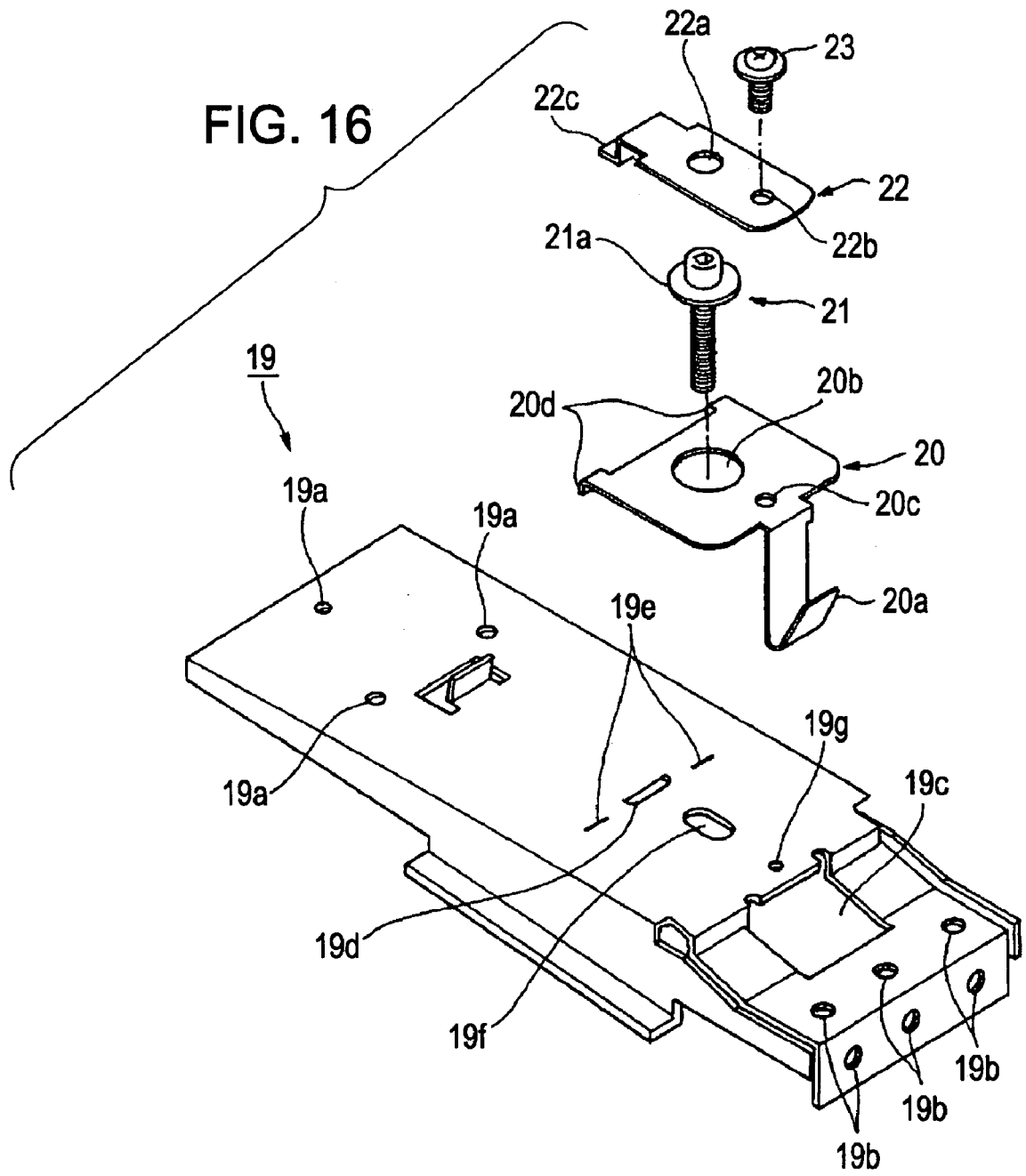
FIG. 16 is an exploded perspective view of a mirror fixing plate in FIG. 6.

FIG. 16 is an exploded perspective view of the mirror fixing plate 19. Referring to FIG. 16, the mirror fixing plate 19 is substantially symmetrically formed by bending a metal sheet of, for example, iron. The mirror fixing plate 19 has a substantially rectangular shape as viewed from above. The mirror fixing plate 19 is bent such that one end of the rectangular plate 19 has a U-shaped cross section and the middle part thereof has a flanged U-shaped cross section. The other end of the mirror fixing plate 19 has a substantially rectangular opening 19c and is bent as shown in FIG. 16.

The rectangular mirror fixing plate 19 has three screw insertion holes 19a for fixing the mirror fixing plate 19 to the top frame segment 14 in the above-described one end. The mirror fixing plate 19 has a slot 19d having a relatively wide width, an elongated hole 19f, and a threaded hole 19g in substantially the middle part of the plate 19 such that the slot 19d, the elongated hole 19f, and the threaded hole 19g are arranged along the axis in the longitudinal direction of the plate 19. Two slits are further arranged in opposite positions of the axis so as to sandwich the slot 19d. Six threaded holes 19b for fixing the mirror fixing plate 19 to the mirror support 17 are arranged in the bent portion of the other end of the mirror fixing plate 19.

Referring to FIG. 16, a temporary support 20 is formed by bending an elastic metal sheet of, for example, stainless steel. The temporary support 20 has an engaging tab 20a, a large circular hole 20b, a small circular hole 20c, and two bent portions 20d. The two bent portions 20d are formed so that the portions 20d can be inserted into the two slits 19e of the mirror fixing plate 19, respectively. When the bent portions 20d are inserted into the respective slits 19e, the large circular hole 20b is aligned with the elongated hole 19f and the small circular hole 20c is aligned with the threaded hole 19g. The diameter of the large circular hole 20b is set so that the large circular hole 20b does not interfere with a flange 21a of an adjusting screw 21, which will be described later, even when the adjusting screw 21 is moved in the elongated hole 19f of the mirror fixing plate 19. The diameter of the small circular hole 20c is larger than that of the thread of a fixing screw 23.

Referring to FIG. 16, the adjusting screw 21 has such a shape that the circular flange 21a is integrated with, for example, a hexagon socket head cap screw. The diameter of the flange 21a is smaller than that of the large circular hole 20b of the temporary support 20 and the thickness of the flange 21a is thicker than that of the temporary support 20. The adjusting screw 21 has a fine pitch thread. The pitch is set to, for example, 0.2 mm.

In FIG. 16, a fixing plate 22 is used for fixing the temporary support 20. The fixing plate 22 has a large circular hole 22a and a small circular hole 22b and further has a bent portion 22c, which has a substantially Z-shaped longitudinal cross section, at one end of the fixing plate 22. The large and small circular holes 22a and 22b are aligned with the large and small circular holes 20b and 20c of the temporary support 20. The diameter of the large circular hole 22a is larger than that of the head of the adjusting screw 21. The diameter of the small circular hole 22b is larger than that of the thread of the fixing screw 23.

The mirror fixing plate 19 having the above-described structure is arranged like a bridge between substantially the middle portions of the top frame segment 14 and the mirror support 17 (see FIG. 6). Referring to FIG. 18, the mirror fixing plate 19 is fixed to the top frame segment 14 by three fixing screws 29, which are screwed from below into the top frame segment 14 through the screw insertion holes 19a. The portion, where the opening 19c is arranged, of the mirror fixing plate 19 is fixed to the mirror support 17 using six fixing screws 27, which are screwed into the mirror support 17 through the six threaded holes 19b, respectively.

Thus, the mirror fixing plate 19 is fixed to the top frame segment 14 and the mirror support 17. The mirror fixing plate 19 reinforces the mirror support 17 to prevent the deformation of the mirror support 17, which is formed by bending the metal sheet.

The above-described temporary support 20, the adjusting screw 21, the fixing plate 22, and the fixing screw 23 are used in a predetermined procedure for attachment of the projection mirror 30 to the top frame segment 14 and the mirror support 17. A procedure for attaching the above-described components to the mirror fixing plate 19 will be described in brief.

Referring to FIG. 16, the two bent portions 20d of the temporary support 20 are inserted into the respective slits 19e of the mirror fixing plate 19 and the adjusting screw 21 is then inserted into the elongated hole 19f. At that time, the flange 21a of the adjusting screw 21 is arranged so as not to interfere with the large circular hole 20b of the temporary support 20. Subsequently, the bent portion 22c of the fixing plate 22 is inserted into and engaged with the slot 19d of the mirror fixing plate 19. The fixing screw 23 is screwed into the threaded hole 19g of the mirror fixing plate 19 through the small circular holes 22b and 20c, so that the fixing plate 22 is pressed onto the flange 21a of the adjusting screw 21. Thus, the fixing plate 22 is fixed so that the adjusting screw 21 is not loosened. In other words, to rotate the adjusting screw 21, the fixing screw 23 is loosened to release the pressing force applied to the flange 21a. The adjusted position of the adjusting screw 21 is held by retightening the fixing screw 23.

The projection mirror 30 will now be described with reference to FIGS. 5, 7A, 7B, and 17 to 21D.

Figure 7A:
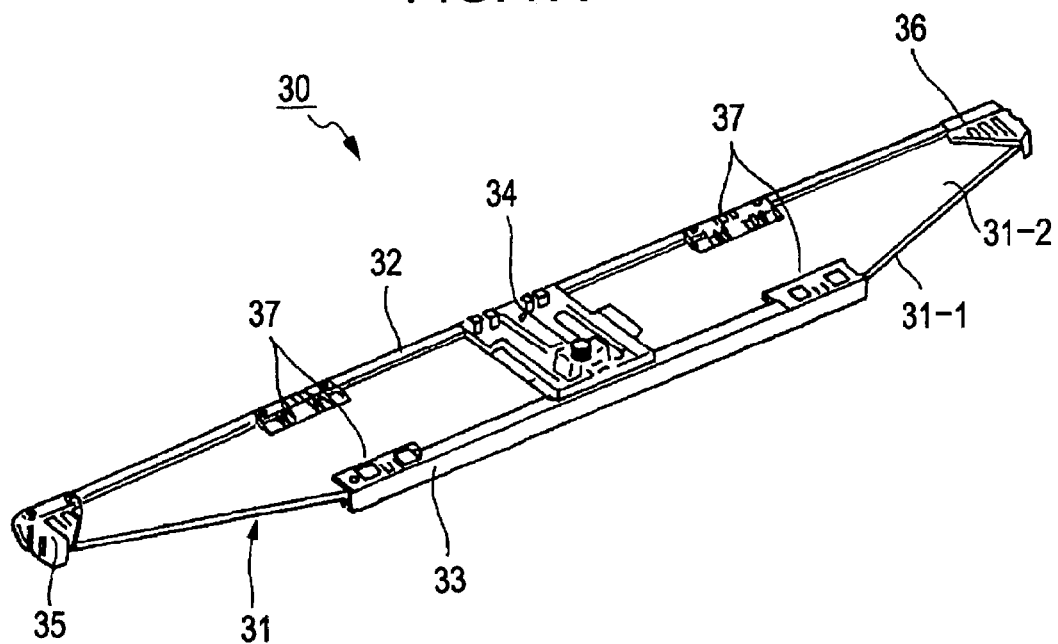
FIG. 7A is a perspective view of a projection mirror in FIG. 5.
Figure 7B:
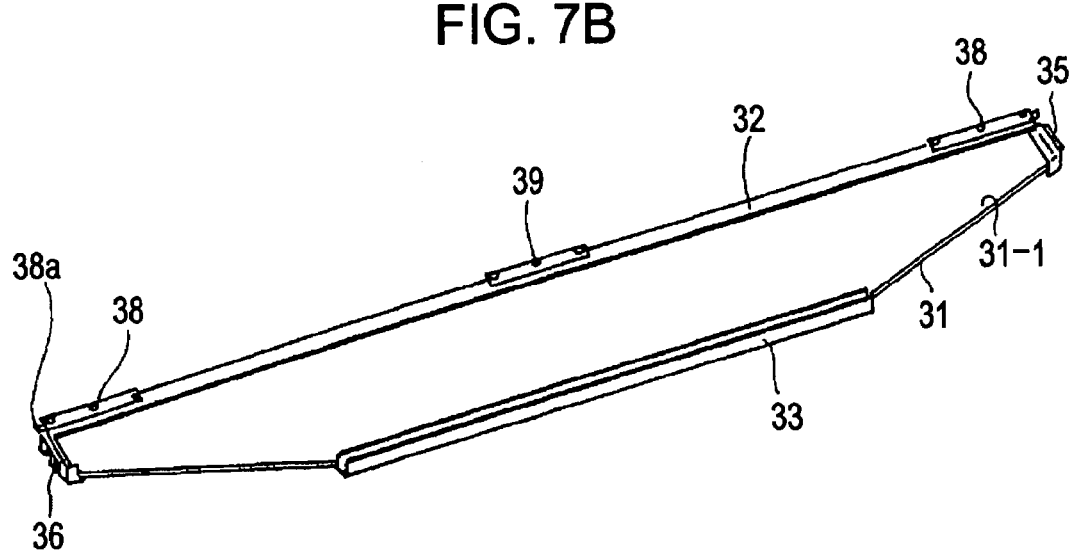
FIG. 7B is a perspective view of the reversed projection mirror.
Figure 19:
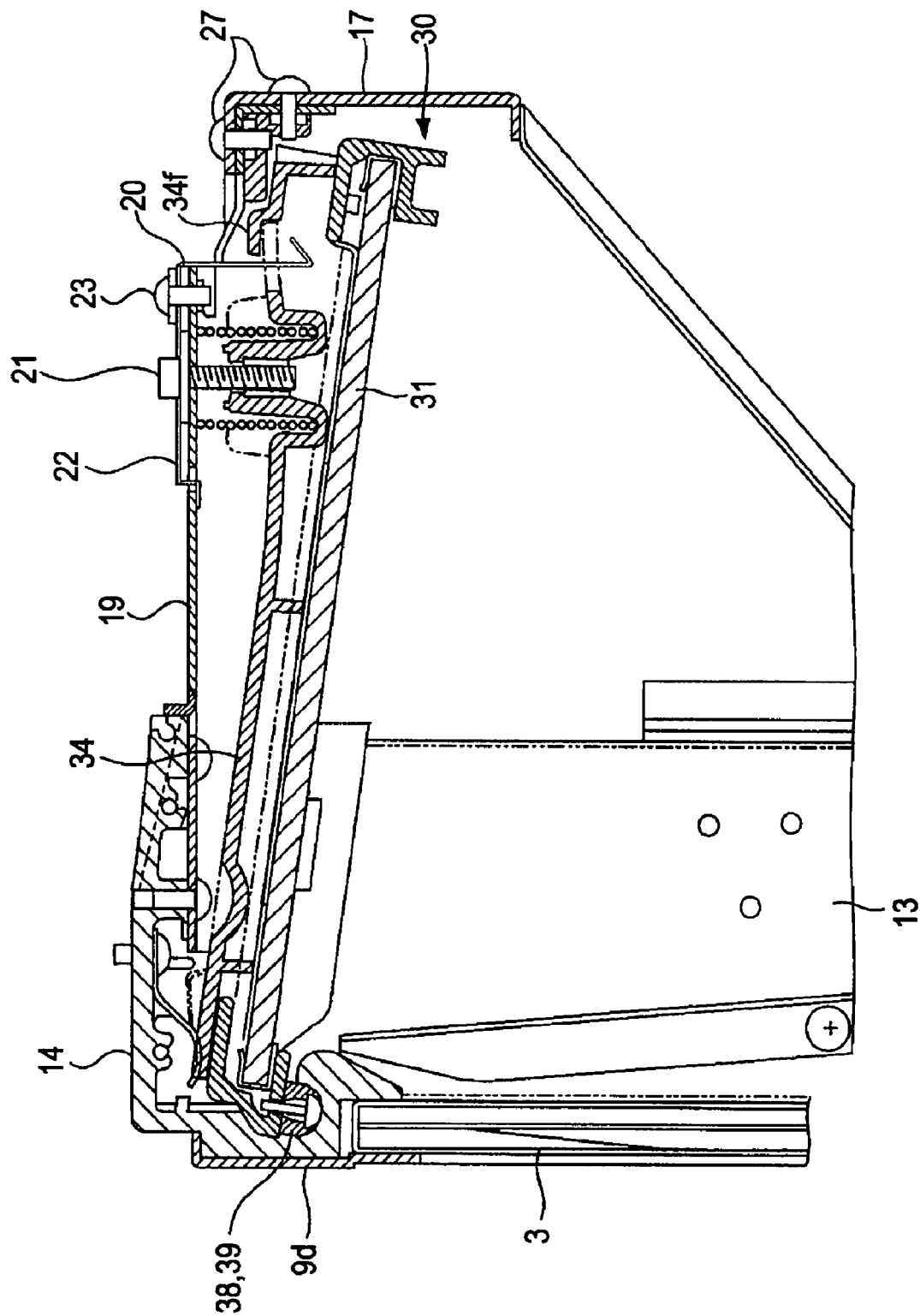
FIG. 19 is a cross-sectional view showing a state of the attached projection mirror in the display unit in FIG. 5.
Figure 20:
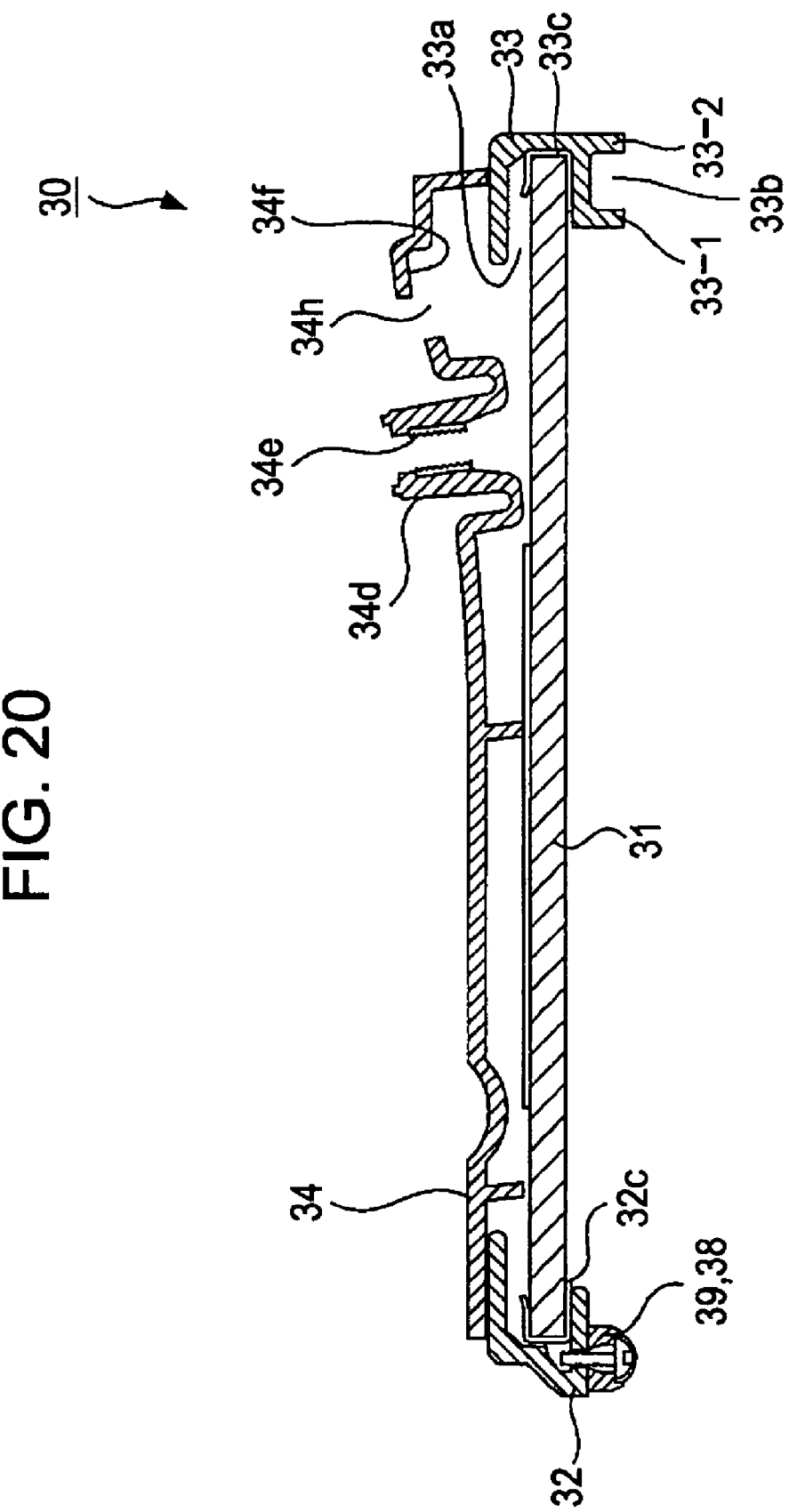
FIG. 20 is a cross-sectional view of the projection mirror in FIG. 7A taken along the line passing through the longitudinal axis of the projection mirror.
Figure 21A:
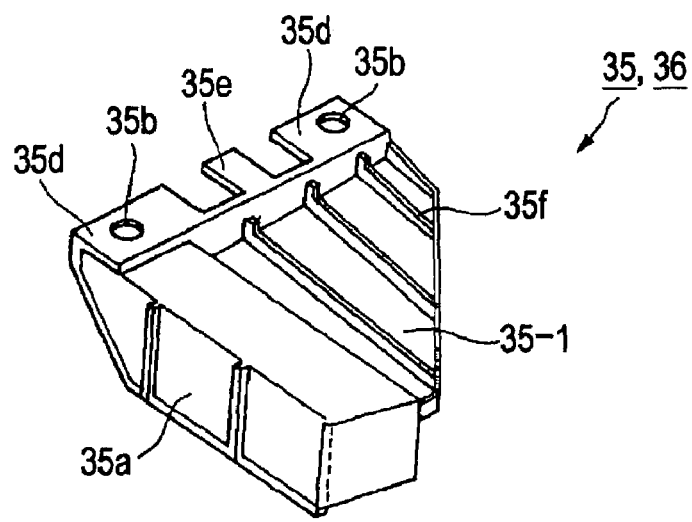
FIGS. 21A to 21D show components arranged in the projection mirror shown in FIGS. 7A and 7B, FIG. 21A being a perspective view of a support piece, FIG. 21B being a perspective view of the reversed support piece, FIG. 21C being a perspective view of a retaining piece, FIG. 21D being a perspective view of a shaft piece.
Figure 21B:
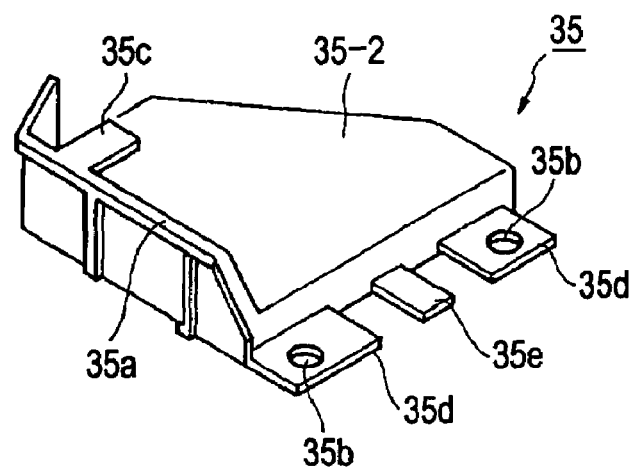
Figure 21C:
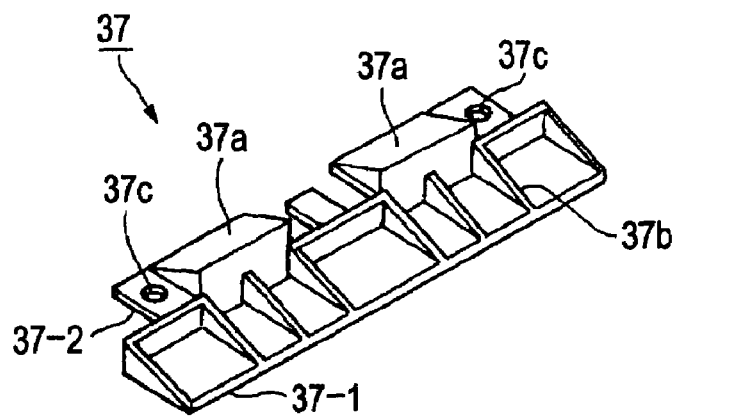
Figure 21D:
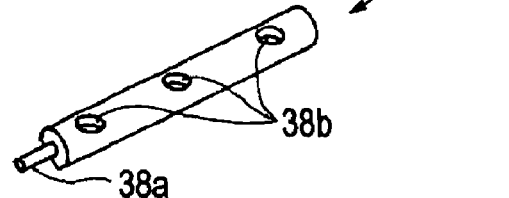

FIG. 7A is a perspective view of the projection mirror 30 as viewed from above. FIG. 7B is a perspective view of the reversed projection mirror 30 as viewed from above. FIG. 17 is a perspective view of the mirror holding plate 34. FIG. 18 is a cross-sectional view of the top frame segment 14 just before the projection mirror 30 in FIG. 7A is attached to the top frame segment 14. FIG. 19 is a cross-sectional view of the top frame segment 14, to which the projection mirror 30 is attached, taken along the line passing through the longitudinal axis of the projection mirror 30. FIG. 20 is a cross-sectional view of the projection mirror 30, shown in FIG. 7A, taken along the line passing through the longitudinal axis thereof. FIG. 21A is a perspective view of a left support piece. FIG. 21B is a perspective view of the reversed left support piece. FIG. 21C is a perspective view of a retaining piece. FIG. 21D is a perspective view of a shaft piece.

Referring to FIGS. 7A and 7B, the projection mirror 30 includes the flat mirror 31, a long holding frame 32, a short holding frame 33, the mirror holding plate 34, a left support piece 35, a right support piece 36, four retaining pieces 37, two shaft pieces 38, a shaft piece 39, and two strip-shaped mirror protective sheets 32c and 33c (refer to FIG. 20). The flat mirror 31 is made of a glass plate having a reflecting surface 31-1.

As shown in FIGS. 7A and 7B, the flat mirror 31 has a shape obtained by cutting right-angled triangular parts in two corners of a strip rectangular glass plate such that one of the two long sides of the plate is left as it is. A reflecting film is arranged on one surface of the glass plate having the above-described shape. The reflecting film is formed by evaporating metal, such as aluminum, onto the glass plate.

The long holding frame 32 has a substantially U-shaped cross section as shown by hatching in FIG. 20. This frame is formed of an extruded material of aluminum alloy and has a groove. The length of the holding frame 32 is substantially equal to the long side of the flat mirror 31. The width of the groove of the frame 32 is larger than the thickness of the flat mirror 31. The holding frame 32 has threaded holes (not shown) in predetermined positions.

The short holding frame 33 is formed of an extruded material of aluminum alloy. The holding frame 33 has a substantially Y-shaped cross section as shown by hatching in FIG. 20 and has a large groove 33a and a small groove 33b. The length of the holding frame 33 is substantially equal to the short side opposite to the long side of the flat mirror 31. The width of the large groove 33a is larger than the thickness of the flat mirror 31. The holding frame 33 has threaded holes (not shown) in predetermined positions. Two side walls 33-1 and 33-2 of the small groove 33b serve as reinforcing ribs for increasing the rigidity of the holding frame 33 to prevent the deformation of the frame 33.

As shown in FIG. 7A, the mirror holding plate 34 is fixed to substantially middle parts of the two holding frames 32 and 33. Referring to FIG. 17, the mirror holding plate 34 has a substantially rectangular shape having a complex symmetrical pattern of protrusions and recesses. Since the mirror holding plate 34 is thin as shown in FIG. 20, an aluminum alloy plate is formed by die casting and predetermined portions of the formed plate are subjected to finish machining, thus forming the mirror holding plate 34.

Figure 17:
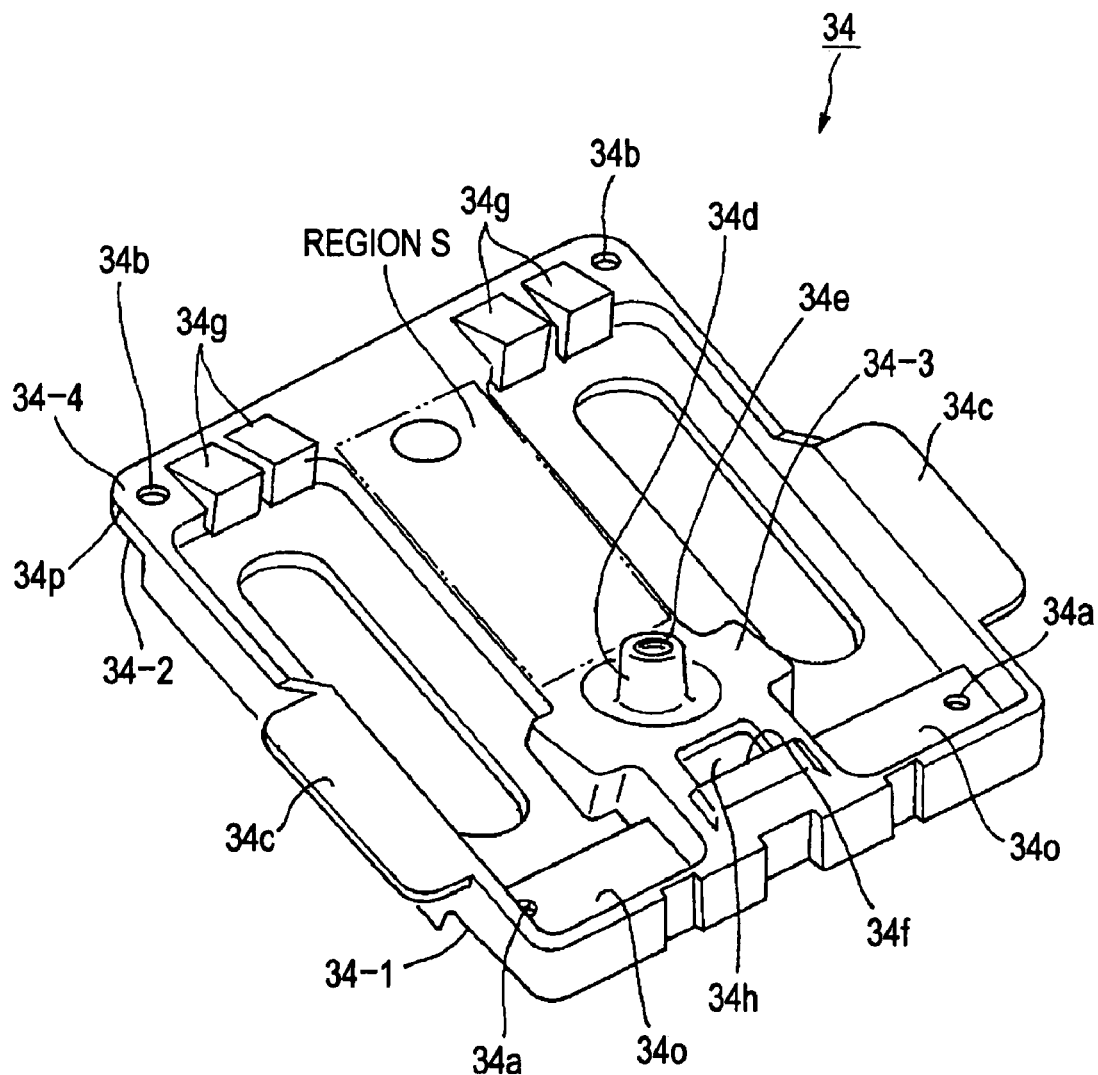
FIG. 17 is a perspective view of a mirror holding plate in FIG. 7A.

Referring to FIG. 17, the mirror holding plate 34 has the following pattern: Two elongated, substantially rectangular recesses are arranged in parallel. A surface 34-4 extends from the upper edges of the two recesses such that the length of the surface 34-4 is longer than that of each recess and a region S is arranged between the two recesses. The surface 34-4 includes projecting part 34p, serving as one side of the mirror holding plate 34, and flat portions 34o remote from the projecting part 34p.

Upper edges of substantially half part, including the flat portions 34o, of the mirror holding plate 34 extend upward and serve as side walls. An inclined surface 34-3 is arranged so as to extend from the region S between the two recesses.

Referring to FIG. 17, the mirror holding plate 34 has a substantially cylindrical spring guide 34d, a threaded hole 34e, a substantially rectangular opening 34h, and a receiving portion 34f. The spring guide 34d is arranged on the surface 34-3 along the longitudinal axis of the mirror holding plate 34. The threaded hole 34e is arranged along the axis of the spring guide 34d. In addition, reinforcing protrusions 34g are arranged in the projecting part 34p on both sides of the longitudinal axis of the mirror holding plate 34. Each reinforcing protrusion 34g has a substantially triangular cross section. Substantially rectangular, flat handles 34c are arranged on both sides of the mirror holding plate 34 such that the spring guide 34d is positioned between the handles 34c.

Referring to FIG. 20, the spring guide 34d is arranged in the mirror holding plate 34 such that the axis of the spring guide 34d is not perpendicular to the flat mirror 31. The spring guide 34d is arranged so that the axis thereof is substantially orthogonal to the mirror fixing plate 19 when the projection mirror 30 is attached to the top frame segment 14 as shown in FIG. 19. The opening 34h has such a width that the engaging tab 20a of the temporary support 20 is easily insertable into the opening 34h. The receiving portion 34f is positioned so as to be in contact with the free end of the engaging tab 20a when the engaging tab 20a is inserted into the opening 34h as shown in FIG. 19.

Referring to FIG. 17, a lower surface 34-2 of the projecting part 34p of the mirror holding plate 34 is subjected to flat finish machining. The projecting part 34p has two screw insertion holes 34b. A lower surface 34-1 under the flat portions 34o is subjected to flat finish machining. The flat portions 34o each have a screw insertion hole 34a.

The above-described holding frame 32 is fixed using the lower surface 34-2 as a reference. The above-described holding frame 33 is fixed using the lower surface 34-1 as a reference.

Referring to FIGS. 7A and 7B, the left and right support pieces 35 and 36, which are mirror images of each other, are arranged in the left and right ends of the long holding frame 32 to prevent the flat mirror 31 from dropping from the groove of the holding frame 32.

The support piece 35 will now be described as an example. Referring to FIG. 21A, the left support piece 35 has a plurality of reinforcing ribs 35f, formed by plastic molding, on an upper surface 35-1 of the piece 35. Referring to FIG. 21B, a lower surface 35-2 of the left support piece 35 is substantially flat. A side wall 35a extends from the lower surface 35-2. A tab 35c protrudes from the edge of the side wall 35a in parallel to the lower surface 35-2. Two rectangular tabs 35d each having a screw insertion hole 35b and a tab 35e protrude from the left support piece 35 such that the level of each of the tabs 35d and 35e is different from that of the surface 35-2.

The surface 35-2 shown in FIG. 21B is held so as to face a glass surface 31-2 of the above-described flat mirror 31 with a predetermined gap therebetween.

Referring to FIG. 7A, the two retaining pieces 37 are arranged in each of the holding frames 32 and 33. The retaining pieces 37 are used to hold the flat mirror 31 in the grooves of the holding frames 32 and 33 without providing a large clearance.

Referring to FIG. 21C, each retaining piece 37 is molded from plastic resin so as to have a plurality of ribs. The retaining piece 37 is light and is relatively hard to deform. The retaining piece 37 has the following pattern: Substantially triangular reinforcing ribs 37b are arranged on a first lower surface 37-1. Screw insertion holes 37c and triangular reinforcing protrusions 37a are arranged on a second lower surface 37-2. The level of the first lower surface 37-1 is different from that of the second lower surface 37-2. The difference in level is set so as to form a small gap between the glass surface 31-2 of the flat mirror 31 and the first lower surface 37-1 of each retaining piece 37 when the retaining pieces 37 are secured to the holding frames 32 and 33 using screws as shown in FIG. 7A.

Referring to FIG. 7B, the shaft pieces 38 and 39 are attached to the holding frame 32 on the reflecting surface 31-1 of the flat mirror 31 of the projection mirror 30. The shaft piece 39 is arranged in substantially the middle of the holding frame 32. The shaft pieces 38 are arranged on both ends of the holding frame 32, respectively.

Referring to FIG. 21D, the shaft pieces 38 and 39 each have a substantially semicylindrical shape. Each shaft piece has three countersunk screw insertion holes 38b arranged on its side surface. A shaft 38a extends from the center of one end surface of each shaft piece 38. The shaft piece 39 has no shaft 38a.

The above-described components are assembled into the projection mirror 30 as follows: First, the shaft pieces 38 and 39 and the left support piece 35 are secured to the holding frame 32 using screws as shown in FIG. 7B. The holding frame 32 is then fixed to the mirror holding plate 34 such that the longitudinal axis of the mirror holding plate 34 is orthogonal to that of the holding frame 32.

Subsequently, while the edge of the long side of the flat mirror 31 is covered with the mirror protective sheet 32c (FIG. 20), the covered edge of the flat mirror 31 is fitted into the U-shaped groove of the holding frame 32. Simultaneously, one end of the flat mirror 31 is brought into contact with the left support piece 35 such that the glass surface 31-2 faces the mirror holding plate 34.

While the edge of the side parallel to the long side of the flat mirror 31 is covered with the mirror protective sheet 33c (FIG. 20), the covered edge of the flat mirror 31 is fitted into the large groove 33a of the holding frame 33. The holding frame 33 is secured to the mirror holding plate 34 using screws.

The right support piece 36 is brought into contact with the other end of the flat mirror 31 and is secured to the holding frame 32 using screws.

Thus, the projection mirror 30 is assembled as shown in FIGS. 7A and 7B.

Attachment of the projection mirror 30 assembled as shown in FIGS. 7A and 7B to the frame assembly will now be described with reference to FIGS. 6, 7A, 7B, 16, 18, 19, 22, and 23.

A procedure for attaching the projection mirror 30 to the top frame segment 14 will now be described.

First, the surface, where the mirror holding plate 34 is disposed, of the projection mirror 30 is placed so as to face upward. An operator holds the two handles 34c of the mirror holding plate 34 by hands such that the long holding frame 32 serves as a leading edge.

Figure 18:
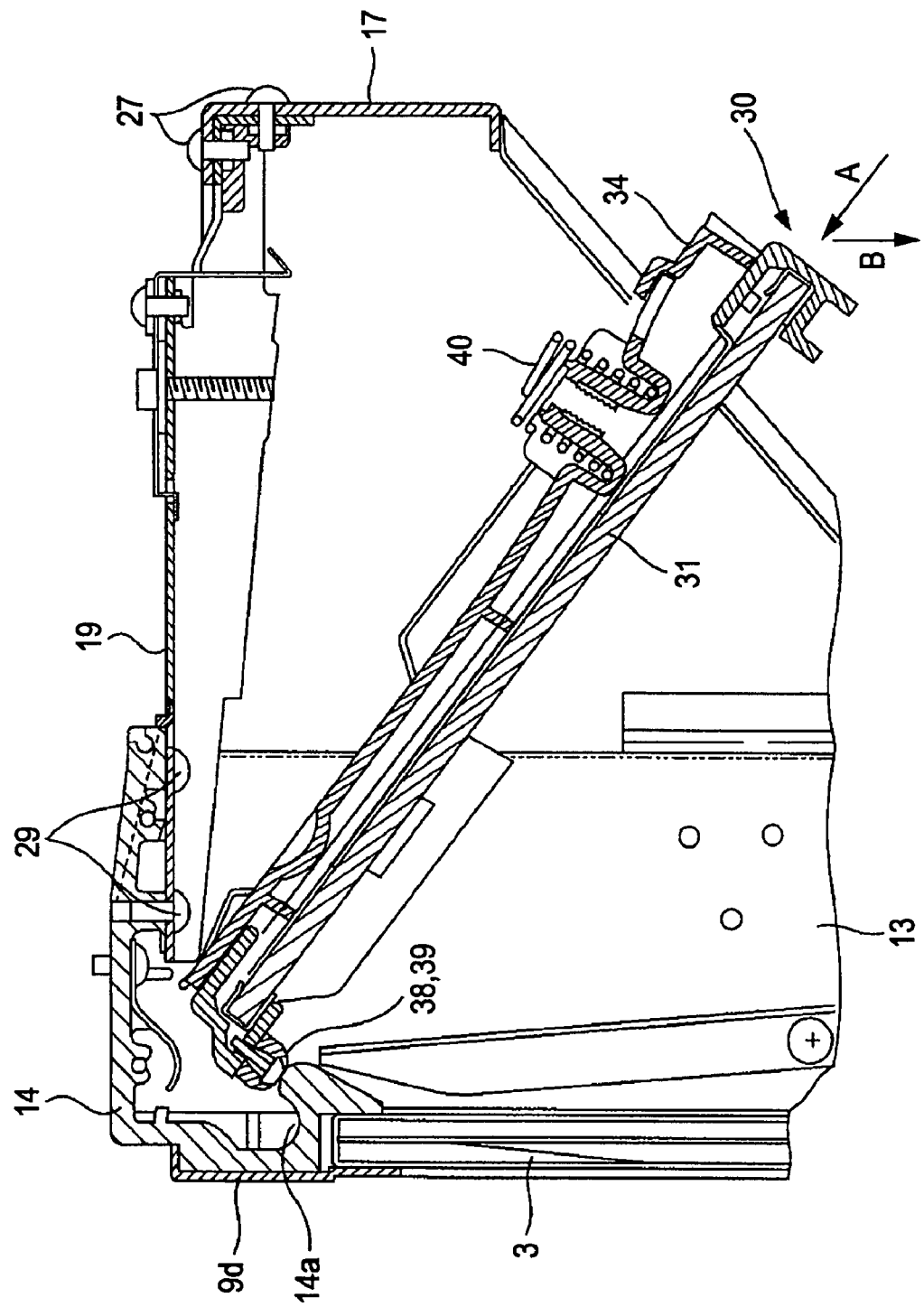
FIG. 18 is a cross-sectional view explaining a state of the projection mirror of the display unit in FIG. 5 just before the projection mirror is attached to the top frame segment.

While holding the mirror holding plate 34, the operator lifts and moves the projection mirror 30 obliquely upward in a direction shown by the arrow A in FIG. 18 so that the shaft pieces 38 and 39 arranged on the long holding frame 32 are brought into contact with the upper surface of the thick part 14e on the rear of the surface 14-1 of the top frame segment 14. Subsequently, the operator further moves the projection mirror 30 in the direction shown by the arrow A so that the shaft pieces 38 and 39 overcome the thick part 14e. The operator then moves the projection mirror 30 downward as shown by the arrow B, so that the shaft pieces 38 and 39 are fitted into the groove 14a of the top frame segment 14.

Thus, the projection mirror 30 is attached to the top frame segment 14 such that the reflecting surface 31-1 of the flat mirror 31 faces downward and the holding frame 32 of the projection mirror 30 is rotatably engaged with the top frame segment 14.

Attachment of the projection mirror 30 to the mirror fixing plate 19 and position adjustment of the projection mirror 30 during attachment will now be described with reference to FIGS. 6, 16, 19, 22, and 23.

Figure 22:
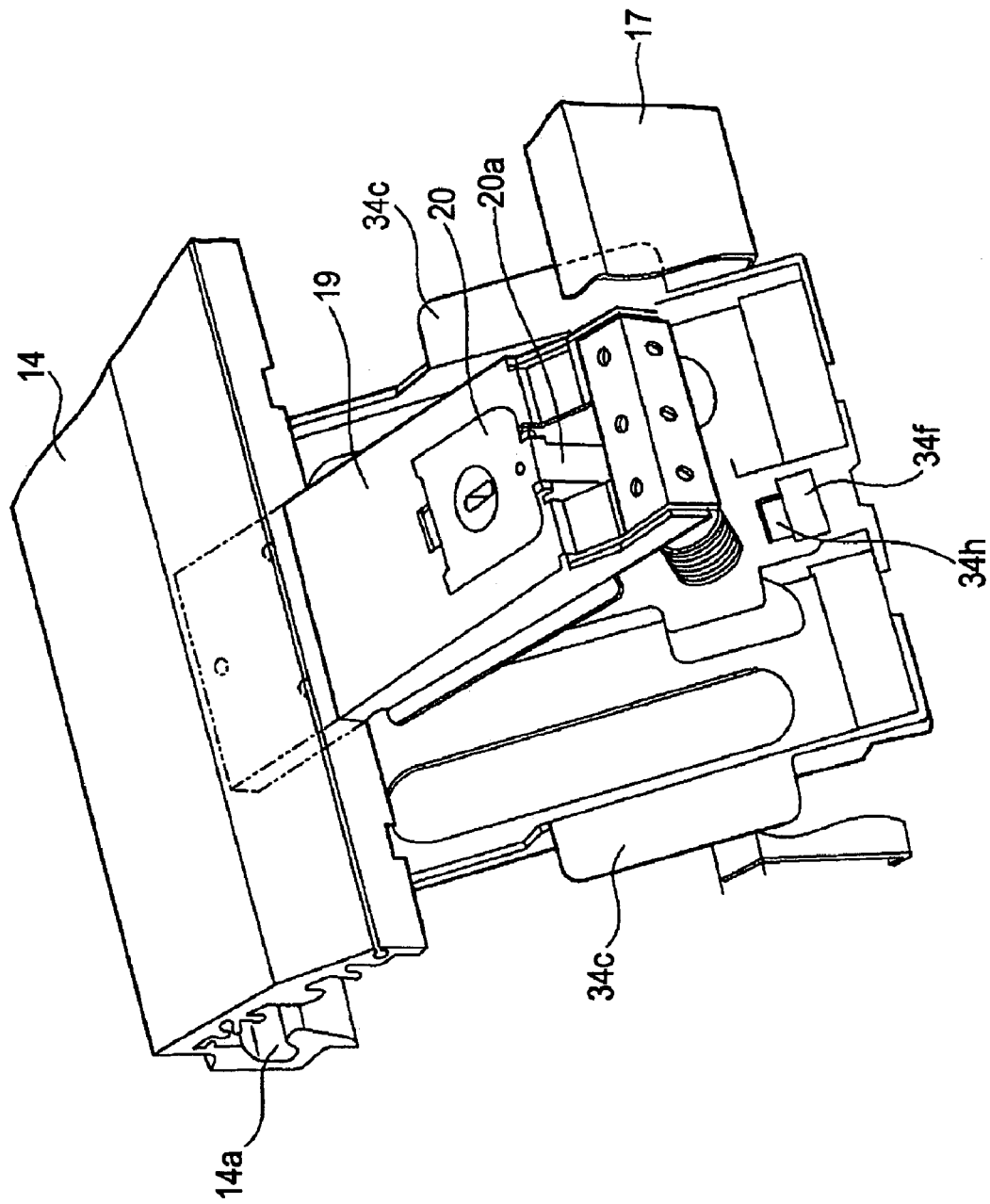
FIG. 22 is an enlarged perspective view of essential part of the display unit, FIG. 22 showing a state just after the projection mirror in FIG. 18 is attached to the top frame segment.

FIG. 22 is a partially cutaway view of the top frame segment 14, to which the projection mirror 30 and the mirror fixing plate 19 are attached. First, the temporary support 20 (refer to FIG. 16) is mounted on the mirror fixing plate 19 as shown in FIG. 22. In FIG. 22, the holding frame 32 of the projection mirror 30 is rotatably engaged with the groove 14a of the top frame segment 14. In this state, a helical compression spring 40 is attached to the spring guide 34d of the mirror holding plate 34.

Subsequently, the projection mirror 30 is pivoted while the handles 34c are being held, so that the engaging tab 20a of the temporary support 20 is inserted into the substantially rectangular opening 34h of the mirror holding plate 34 (see FIG. 19). At that time, since the receiving portion 34f of the mirror holding plate 34 is engaged with the engaging tab 20a of the temporary support 20, the projection mirror 30 is held in a predetermined position even if the operator releases their hands from the handles 34c of the mirror holding plate 34.

The adjusting screw 21 is inserted into the large circular hole 20b of the temporary support 20 and the elongated hole 19f of the mirror fixing plate 19 and is then screwed into the threaded hole 34e arranged in the spring guide 34d of the mirror holding plate 34 (refer to FIGS. 16, 19, and 22).

Subsequently, the amount of screwing of the adjusting screw 21 is controlled such that the adjusting screw 21 is set to an initial coarse position using, for example, a scale arranged on the engaging tab 20a of the temporary support 20 as an index (refer to FIGS. 19 and 23). Controlling the amount of screwing enables fine adjustment of the amount of rotation of the projection mirror 30 about the groove 14a of the top frame segment 14. In this state, the adjusting screw 21 is screwed in the threaded hole 34e of the mirror holding plate 34 such that the adjusting screw 21 presses the helical compression spring 40. For example, when the operator lifts the mirror support 17 while holding the handles 34c of the mirror holding plate 34, the projection mirror 30 is movable until the spring guide 34d is substantially brought into contact with the mirror fixing plate 19. Adjustment at that time may be roughly performed. Final adjustment may be performed in an installation location desired by a user after the display unit 2 is completely assembled.

Subsequently, the fixing plate 22 is fitted to the mirror fixing plate 19, the fixing screw 23 is inserted through the small circular hole 22b of the fixing plate 22 and the small circular hole 20c of the temporary support 20 and is then screwed into the threaded hole 19g of the mirror fixing plate 19. Thus, as shown in FIGS. 19 and 23, the fixing plate 22 and the mirror fixing plate 19 sandwich the flange 21a (see FIG. 16) of the adjusting screw 21 therebetween so that the adjusting screw 21 is not rotated, thus fixing the adjusted position of the adjusting screw 21.

Figure 23:
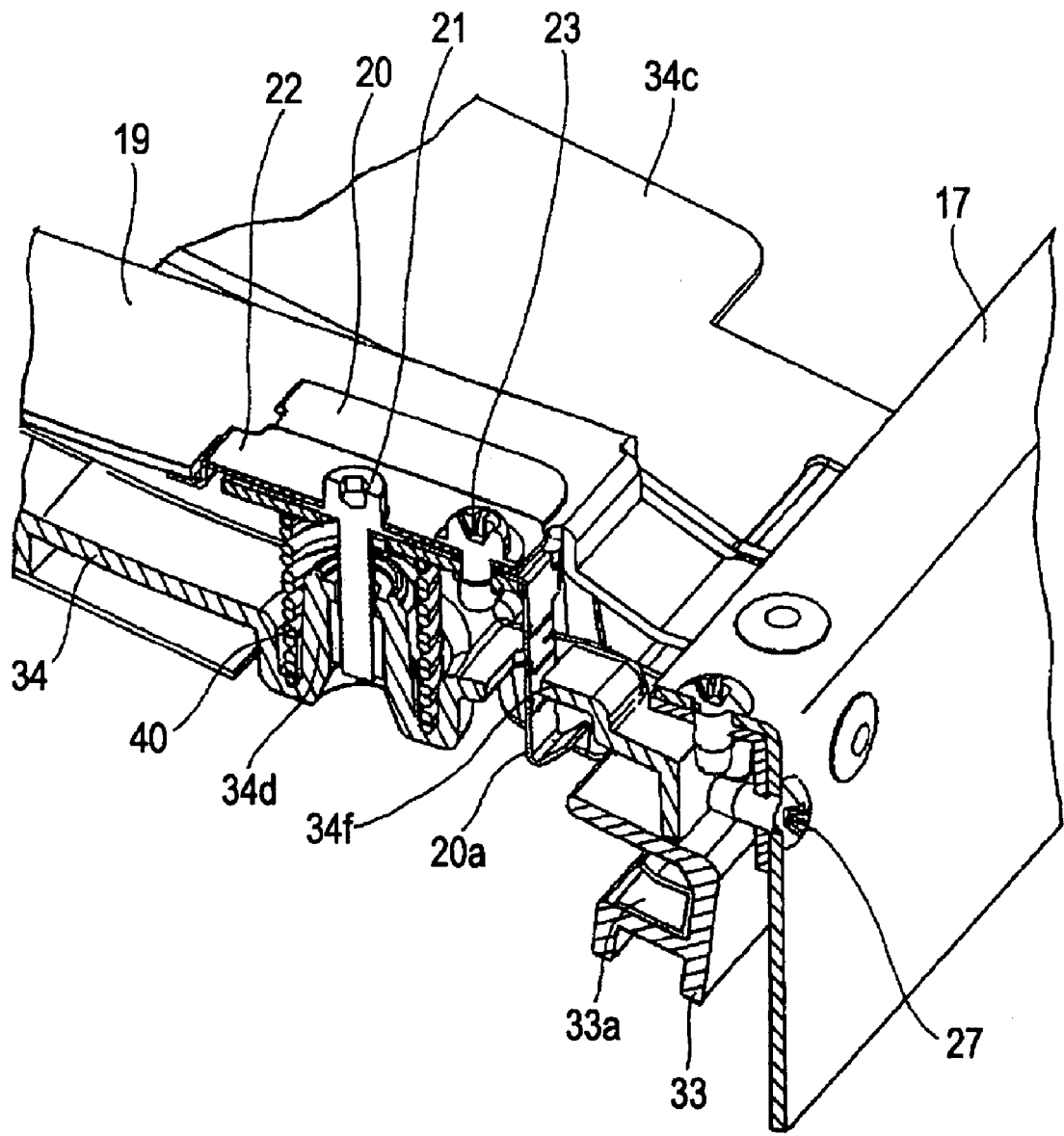
FIG. 23 is a partially cutaway perspective view of essential part of the display unit in which the projection mirror in FIG. 19 is attached to the frame assembly.

FIG. 23 is a perspective, cross-sectional view of essential part where the adjusting screw 21 is arranged after the projection mirror 30 is completely attached as shown in FIG. 19.

As described above, the mirror holding plate 34 of the projection mirror 30 is fixed to the mirror fixing plate 19 which connects the top frame segment 14 to the mirror support 17 after the position of the mirror holding plate 34 is adjusted as shown in FIGS. 6 and 19. The flat mirror 31 of the projection mirror 30 is set at a predetermined angle.

In this instance, when the flat mirror 31 of the projection mirror 30 is inclined so as to form a larger angle with the horizontal plane, an image projected on the screen 3 is moved upward. When the flat mirror 31 of the projection mirror 30 is inclined so as to form a smaller angle with the horizontal plane, the projected image is moved downward.

The optical unit 50 and the lamp cooling device for cooling the lamp provided for the optical unit 50 with air will now be described with reference to FIGS. 24 to 29, and 30A to 33.

The optical unit 50 will first be described with reference to FIGS. 24, 30A to 30C, and 31.

Figure 30A:
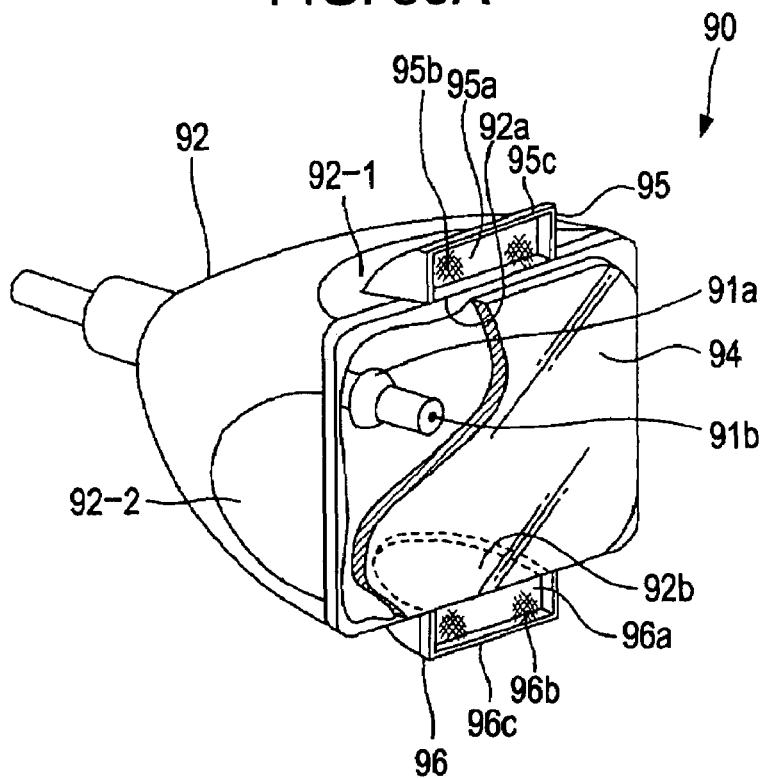
FIG. 30A is a perspective view of a lamp in the rear projection display apparatus in accordance with the embodiment of the present invention.
Figure 30B:
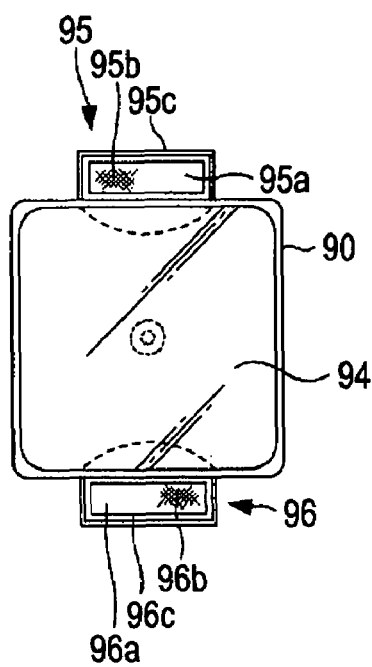
FIG. 30B is a front view thereof.
Figure 30C:
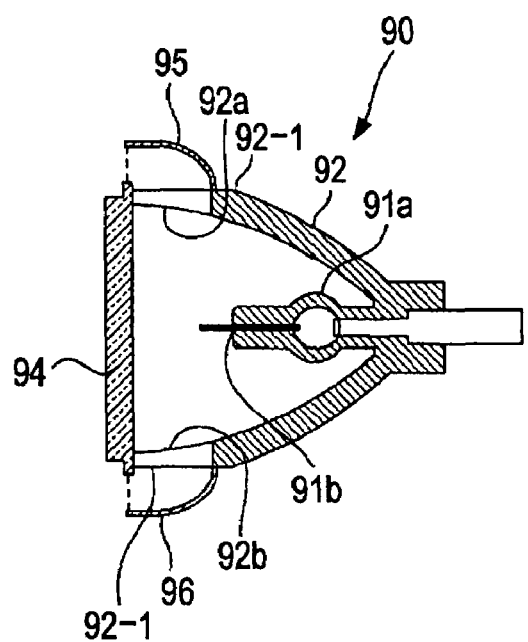
FIG. 30C is a sectional side elevation view thereof.
Figure 31:
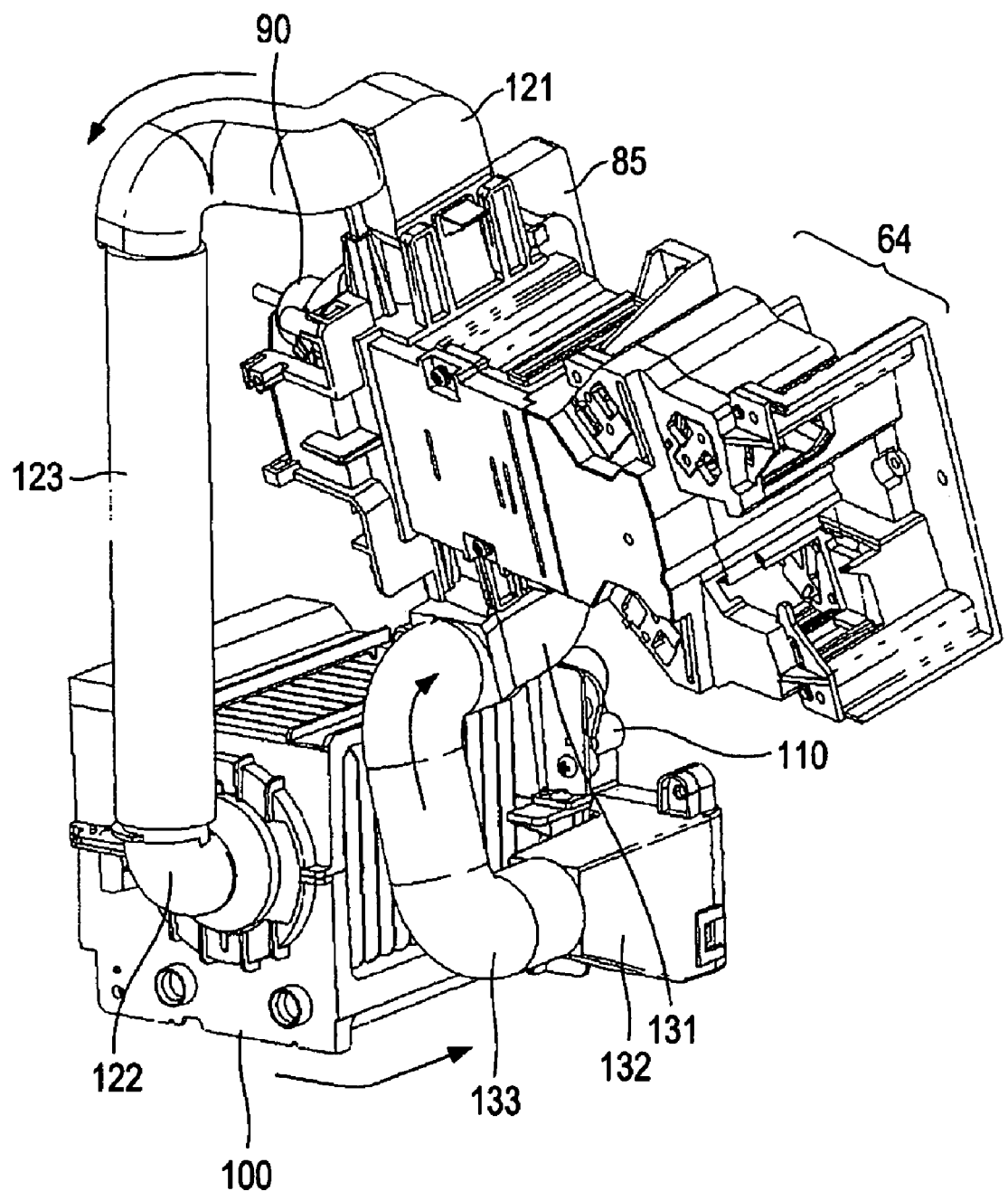
FIG. 31 is a perspective view of a lamp cooling device in the rear projection display apparatus in accordance with the embodiment of the present invention, the lamp cooling device being connected to a light introducing section of the optical unit.

FIG. 30A is a perspective view of the lamp 90. FIG. 30B is a front view thereof. FIG. 30c is a sectional side elevation view thereof. FIG. 31 is a perspective view of a combination of a light introducing section 64 of the optical unit 50 and a lamp cooling device 150. In FIG. 31, a base block 60, a mirror storage section 61, a projection-lens storage section 62, and a liquid crystal projector 63 are not shown.

Referring to FIG. 24, the optical unit 50 includes the mirror storage section 61, the projection-lens storage section 62, the liquid crystal projector 63, the light introducing section 64, the lamp 90 (see FIGS. 30A to 30C), and the base block 60. The mirror storage section 61 has the projection window 51. The projection-lens storage section 62 for storing a projection lens (not shown) is integrated with the mirror storage section 61. The liquid crystal projector 63 combines image signal components of three colors, i.e., R, G, and B, into an image signal and supplies light including a color image based on the image signal to the projection-lens storage section 62. The light introducing section 64 performs color adjustment on light coming from a light source and supplies white light to the liquid crystal projector 63. The lamp 90 supplies light to the light introducing section 64. The base block 60 is arranged under the mirror storage section 61.

Referring to FIG. 31, the lamp 90 is aligned with the light introducing section 64 of the optical unit 50 through an adaptor 85. In the optical unit 50, the liquid crystal projector 63 is combined with the light introducing section 64 using locating pins (not shown) so as to have a predetermined positional relation therebetween and, after that, the combination of the liquid crystal projector 63 and the light introducing section 64 is aligned and fixed to the base block 60. The integrated combination of the mirror storage section 61 and the projection-lens storage section 62 is aligned and fixed to the base block 60.

As shown in FIG. 31, the lamp 90 is incorporated into a pipe line composed of the radiator 100, a blower 110, ducts 121, 122, 131, and 132, and tubes 123 and 133. Those components constitute the lamp cooling device 150 which includes the interior space of the lamp 90 as a part of an air circulation path. The lamp 90 and the lamp cooling device 150 will be described later.

Referring to FIG. 24, the optical unit 50 is attached to the bottom frame segment 11 constituting the frame assembly such that the base block 60 of the optical unit 50 is rotatably engaged with the rotating shaft 70 on the bottom frame segment 11. The rotating shaft 70 serves as the reference of rotation. Attachment pins 65, each of which is used together with a helical compression spring 66 serving as a first elastic member, are attached to three portions on the sides of the base block 60 so that the optical unit 50 is slightly movable about the rotating shaft 70 on the bottom frame segment 11 without being separated away from the bottom frame segment 11.

In other words, in the rear projection display apparatus according to the present embodiment, image display adjustment is performed by slightly moving the base block 60 of the optical unit 50 about the rotating shaft 70.

Each attachment pin 65 is inserted into two washers 67 and the helical compression spring 66 arranged between the washers 67. When the attachment pins 65 are attached to the three portions on the sides of the base block 60, a large urging force is caused by the helical compression springs 66. The attachment pin 65, the two washers 67, and the helical compression spring 66 constitute such an urging mechanism.

The base block 60 will now be described with reference to FIGS. 24 to 28.

Figure 25:
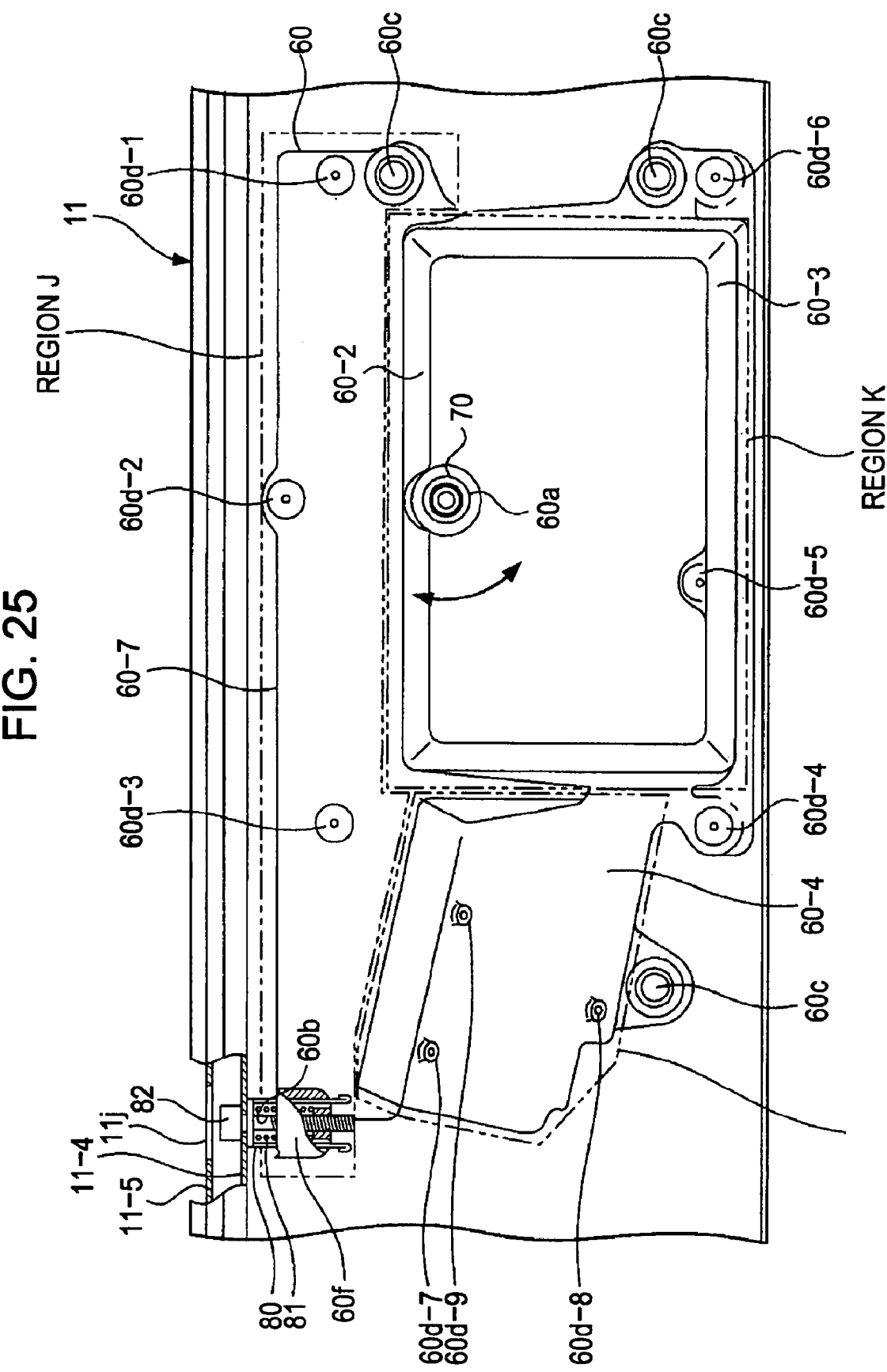
FIG. 25 is a plan view of a base plate of the optical unit, FIG. 25 explaining the attachment of the optical unit in FIG. 24.

The base block 60 is formed by aluminum die casting with high accuracy and is relatively thin. FIG. 25 is a plan view of the base block 60. Referring to FIG. 25, the base block 60 has a substantially rectangular shape. This shape includes three regions J, K, and L having different three-dimensional structures, the regions being shown by two-dot chain lines.

Figure 26:
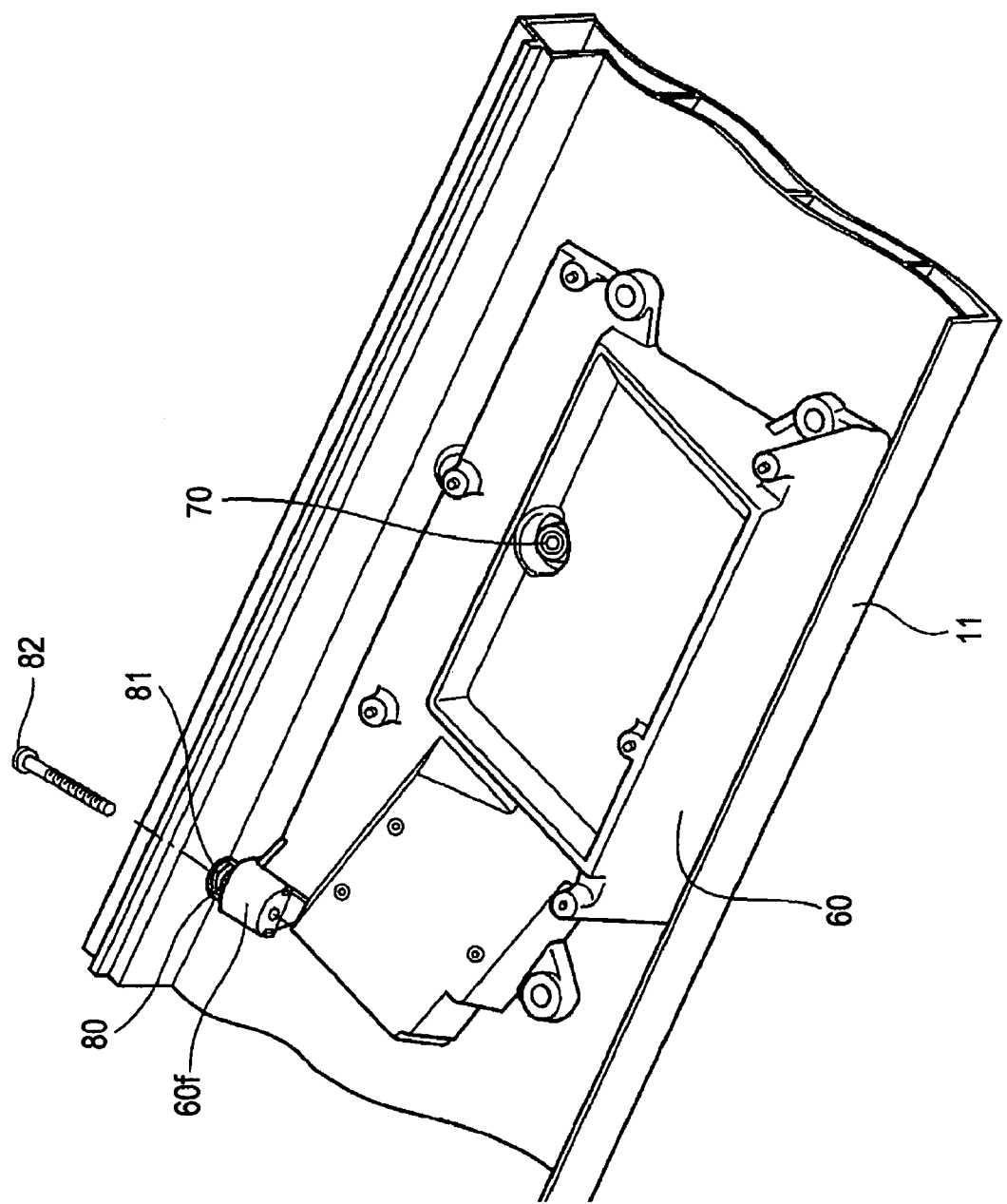
FIG. 26 is a perspective view of the base plate of the optical unit, FIG. 26 explaining the attachment of the optical unit in FIG. 24.

The part, corresponding to the region J shown in FIG. 25, of the base block 60 is substantially plate-shaped and is integrated with a substantially cylindrical portion 60f shown in left part of FIG. 25. The cylindrical portion 60f has a threaded hole 60b. FIG. 26 is a perspective view of the base block 60 in FIG. 25. As shown in FIG. 26, the adjusting screw 82 is screwed into the threaded hole 60b in a state in which the base block 60 is rotatably attached to the bottom frame segment 11.

Figure 27:
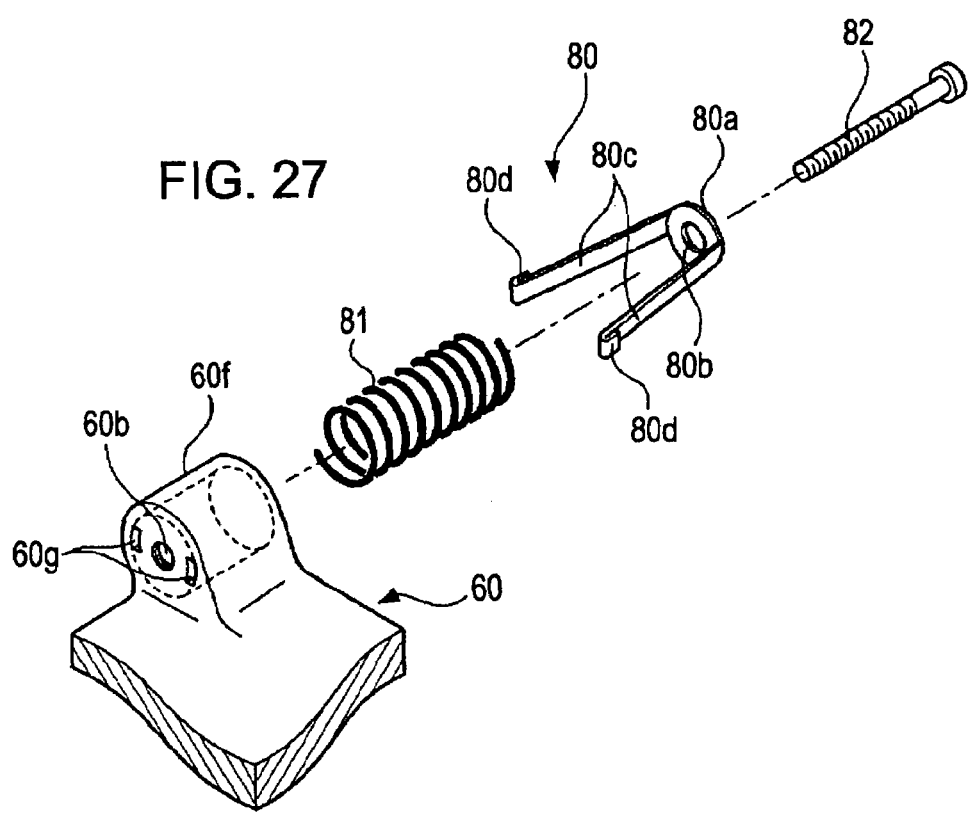
FIG. 27 is an exploded perspective view of a cylindrical portion included in a base block of the optical unit of the rear projection display apparatus in accordance with the embodiment of the present invention.

FIG. 27 is a partially cutaway exploded perspective view of the cylindrical portion 60f of the base block 60. Referring to FIG. 27, the bottom of the cylindrical portion 60f has the threaded hole 60b at its center and two arcuate slots 60g on both sides of the threaded hole 60b. A spring retainer 80 holding a helical compression spring 81 is inserted into the cylindrical portion 60f and is then inserted into the arcuate slots 60g in the bottom of the cylindrical portion 60f. The helical compression spring 81 serves as a second elastic member. The free length of the helical compression spring 81 is relatively long and the spring constant thereof is large.

Referring to FIG. 27, the spring retainer 80 has a substantially U-shaped cross section and includes a disc 80a, a screw insertion hole 80b, two strips 80c extending from the periphery of the disc 80a, and bent portions 80d arranged on free ends of the strips 80c. The disc 80a has a diameter that is larger than the outer diameter of the helical compression spring 81 and is smaller than the inner diameter of the cylindrical portion 60f. The strips 80c are processed so as to have a substantially curved cross section. Each bent portion 80d, formed by bending the free end of the strip 80c outwardly, is insertable through the corresponding arcuate slot 60g.

The helical compression spring 81 is arranged between the strips 80c of the spring retainer 80 and the bent portions 80d are inserted through the respective arcuate slots 60g of the cylindrical portion 60f, so that the spring retainer 80 is engaged with the cylindrical portion 60f while the helical compression spring 81 is compressed. Consequently, the disc 80a of the spring retainer 80 is strongly urged outward by the helical compression spring 81.

The free length of the helical compression spring 81 is determined so that the helical compression spring 81 has a desired compressed state when the spring retainer 80 is attached to the arcuate slots 60g of the cylindrical portion 60f. In FIG. 27, the adjusting screw 82 is screwed into the threaded hole 60b of the cylindrical portion 60f and is used so that the optical unit 50 is slightly moved about the rotating shaft 70.

Referring to FIG. 25, the region K of the base block 60 has a substantially rectangular shape. The mirror storage section 61 in FIG. 24 is positioned in the region K. Referring to FIG. 26, the part in the region K has a three-dimensional structure in which four ridges define a substantially rectangular recess. In the region K, an upper ridge 60-2 is lower than a lower ridge 60-3 in FIG. 25. A hole 60a through which the rotating shaft 70 is inserted is arranged in substantially the middle of the ridge 60-2.

The part corresponding to the region L in FIG. 25 has a protrusion in the form of a substantially horizontally-extending triangular prism. A locating bracket 69, to which the light introducing section 64 and the liquid crystal projector 63 in FIG. 24 are previously positioned and fixed, is mounted in an inclined surface 60-4 in the region L.

Referring to FIG. 25, the base block 60 has three pin insertion holes 60c through which pins are inserted and six reference-level protrusions 60d-1 to 60d-6, each serving as a reference level for attachment of the mirror storage section 61 in the regions J and K. The holes 60c are arranged on the sides of the base block 60. Each of the reference-level protrusions 60d-1 to 60d-6 has a locating protrusion in a predetermined position. The locating protrusion is used for alignment with the locating bracket 69.

The lower surface of the base block 60 is partially protruded to form a reference level of the base block 60 with respect to the bottom frame segment 11. Specifically, in the region J, part under the threaded hole 60b of the cylindrical portion 60f and part under the reference-level protrusion 60d-2 are slightly protruded. In addition, parts under portions surrounding the three pin insertion holes 60c are slightly protruded so as to have a predetermined size. Consequently, when the base block 60 is attached to the bottom frame segment 11, the protruded parts provide a gap between the base block 60 and the bottom frame segment 11.

Referring to FIG. 24, the optical unit 50 is attached to the bottom frame segment 11 through the rotating shaft 70 and the three attachment pins 65, each having the two washers 67 and the helical compression spring 66 between the washers, such that the optical unit 50 is rotatable about the rotating shaft 70 arranged on the bottom frame segment 11.

Figure 28:
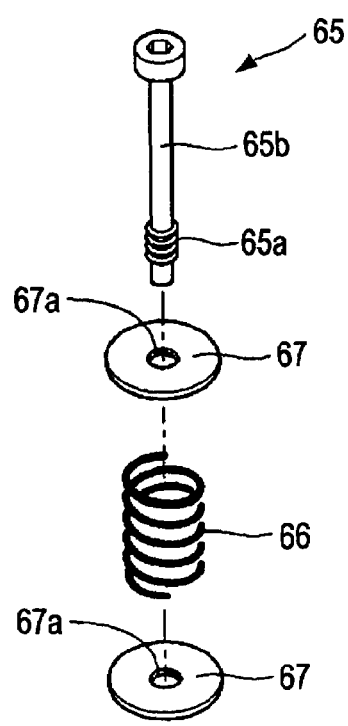
FIG. 28 is an exploded perspective view of an attachment pin used in attaching the optical unit to the bottom frame segment in the rear projection display apparatus in accordance with the embodiment of the present invention.

Referring to FIG. 28, each attachment pin 65 used for attaching the base block 60 to the bottom frame segment 11 is obtained by processing the thread of a hexagon socket head cap screw so as to leave a small part (i.e., a thread 65a). The thread 65a of each attachment pin 65 is formed so as to be screwable into the threaded hole 11o, shown in FIG. 6, in the surface 11-3 of the bottom frame segment 11. A shaft 65b of each attachment pin 65 is formed so as to be smaller than the minimum diameter of the hole 60c of the base block 60. A hole in each washer 67 serves as a threaded hole 67a to be engaged with the thread 65a of the attachment pin 65.

The attachment pins 65 are inserted through the three pin insertion holes 60c of the base block 60, the threads 65a of the respective attachment pins 65 are screwed into the three threaded holes 11o of the bottom frame segment 11, and the attachment pins 65 are further rotated, so that the base block 60 can be attached to the bottom frame segment 11 such that the attachment pins 65 are not separated from the respective threaded holes 11o and each shaft 65b and the associated pin insertion hole 60c provide play. The base block 60 can be urged to the surface 11-3 of the bottom frame segment 11 by the helical compression springs 66, each of which is arranged between the associated two washers 67.

Consequently, the base block 60 is attached rotatably about the rotating shaft 70. The base block 60 can be slightly moved within a predetermined angular range by means of play provided by the difference in diameter between each of the three pin insertion holes 60c and the shaft 65b of the associated attachment pin 65.

In other words, the shaft 65b of each attachment pin 65 is inserted through the washers 67 and the helical compression spring 66, the attachment pins 65 are inserted through the three pin insertion holes 60c of the base block 60 of the optical unit 50, and the attachment pins 65 are screwed into the respective threaded holes of the bottom frame segment 11, so that the base block 60 is pressed onto the bottom frame segment 11 by the urging force of the helical compression springs 66. Thus, the optical unit 50 can be vertically pressed onto the bottom frame segment 11 while having horizontal flexibility. The optical unit 50 can be held stably. The lamp 90 and the lamp cooling device 150 for cooling the lamp 90 with air will now be described with reference to FIGS. 30A to 33.

FIG. 30A is a partially cutaway perspective view of the lamp 90. FIG. 30B is a front view of the lamp 90. FIG. 30C is a sectional side elevation view of the lamp 90.

Referring to FIG. 30C, the lamp 90 includes a light source 91a including a glass tube filled with a discharge gas, a reflector 92 having a paraboloid, and a transparent front plate 94. The light source 91a is enclosed by the reflector 92 and the transparent front plate 94. The reflector 92 has an upper opening 92a and a lower opening 92b adjacent to the transparent front plate 94 as shown in FIG. 30C. An upper connecting duct 95 is joined to the opening 92a and a lower connecting duct 96 is joined to the opening 92b so as to extend the interior space of the lamp 90.

The outer side surfaces of the reflector 92 of the lamp 90 are chamfered such that the reflector 92 has a substantially rectangular shape as viewed from the transparent front plate 94 and each chamfered surface is substantially flat. Referring to FIGS. 30A to 30C, upper and lower flat surfaces 92-1 and left and right flat surfaces 92-2 each have a substantially semioval shape. The upper and lower flat surfaces 92-1 have the semioval openings 92a and 92b, respectively.

Each of the connecting ducts 95 and 96 is an elbow made of a thin metal sheet and has a substantially rectangular cross section. The connecting ducts 95 and 96 cover the semioval upper and lower openings 92a and 92b of the lamp 90, respectively. The connecting ducts 95 and 96 are joined to the reflector 92 using a sealing material, such as low temperature glass, so as to provide substantially rectangular openings 95a and 96a at the front of the lamp 90 (adjacent to the transparent front plate 94). The opening 95a serves as a gas exhaust opening and the opening 96a serves as a gas intake opening.

Referring to FIG. 30B, the substantially rectangular openings 95a and 96b of the connecting duct 95a are covered with wire sheets 95b and 96b, respectively. The wire sheets 95b and 96b each have a relatively small mesh size. A frame seal 95c made of elastic resin is arranged at the front of the rectangular opening 95a. Similarly, a frame seal 96c made of elastic resin is arranged at the front of the rectangular opening 96b.

Figure 32:
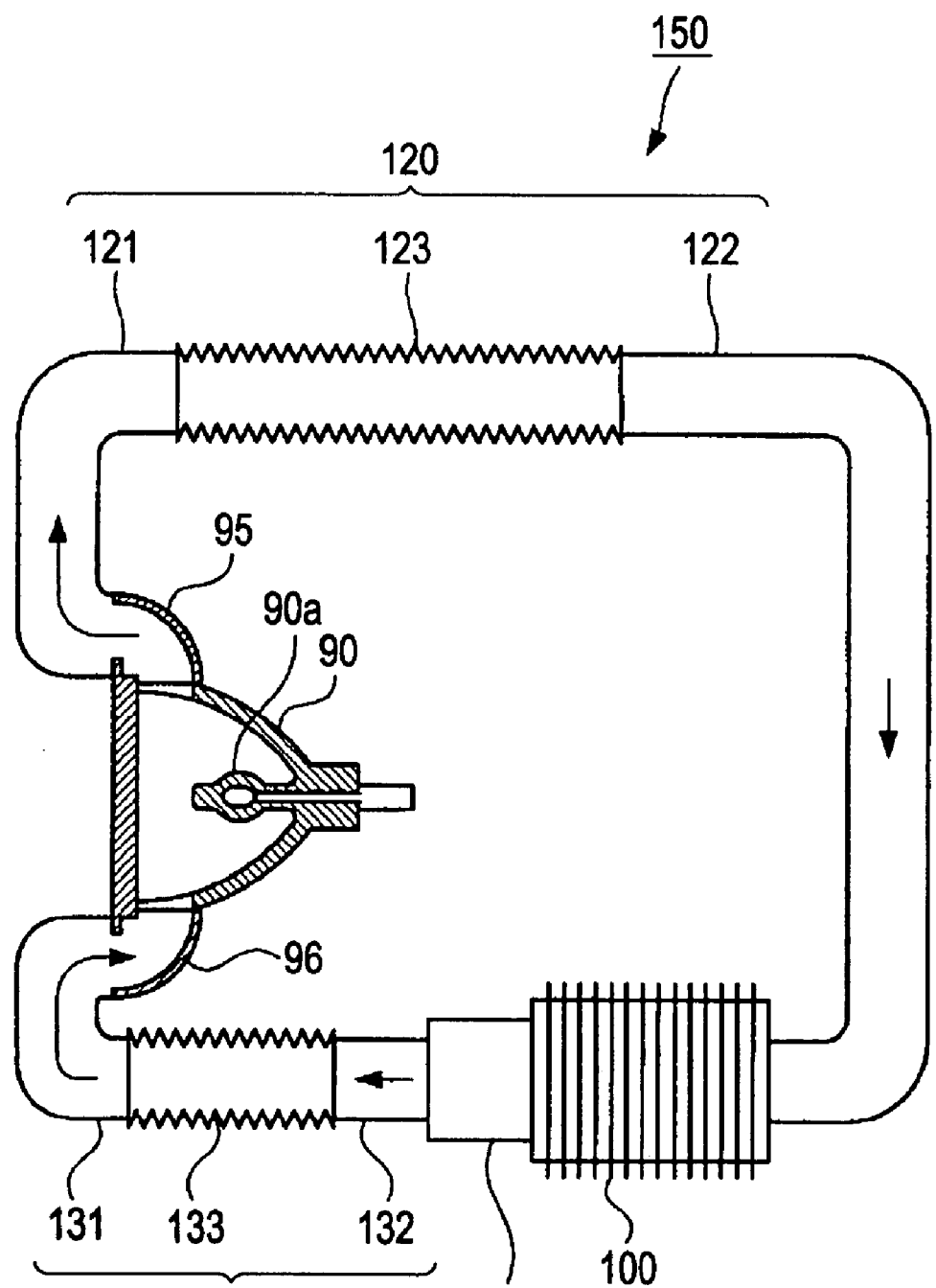
FIG. 32 is a schematic diagram explaining the structure of the lamp cooling device in the rear projection display apparatus in accordance with the embodiment of the present invention.
Figure 33:
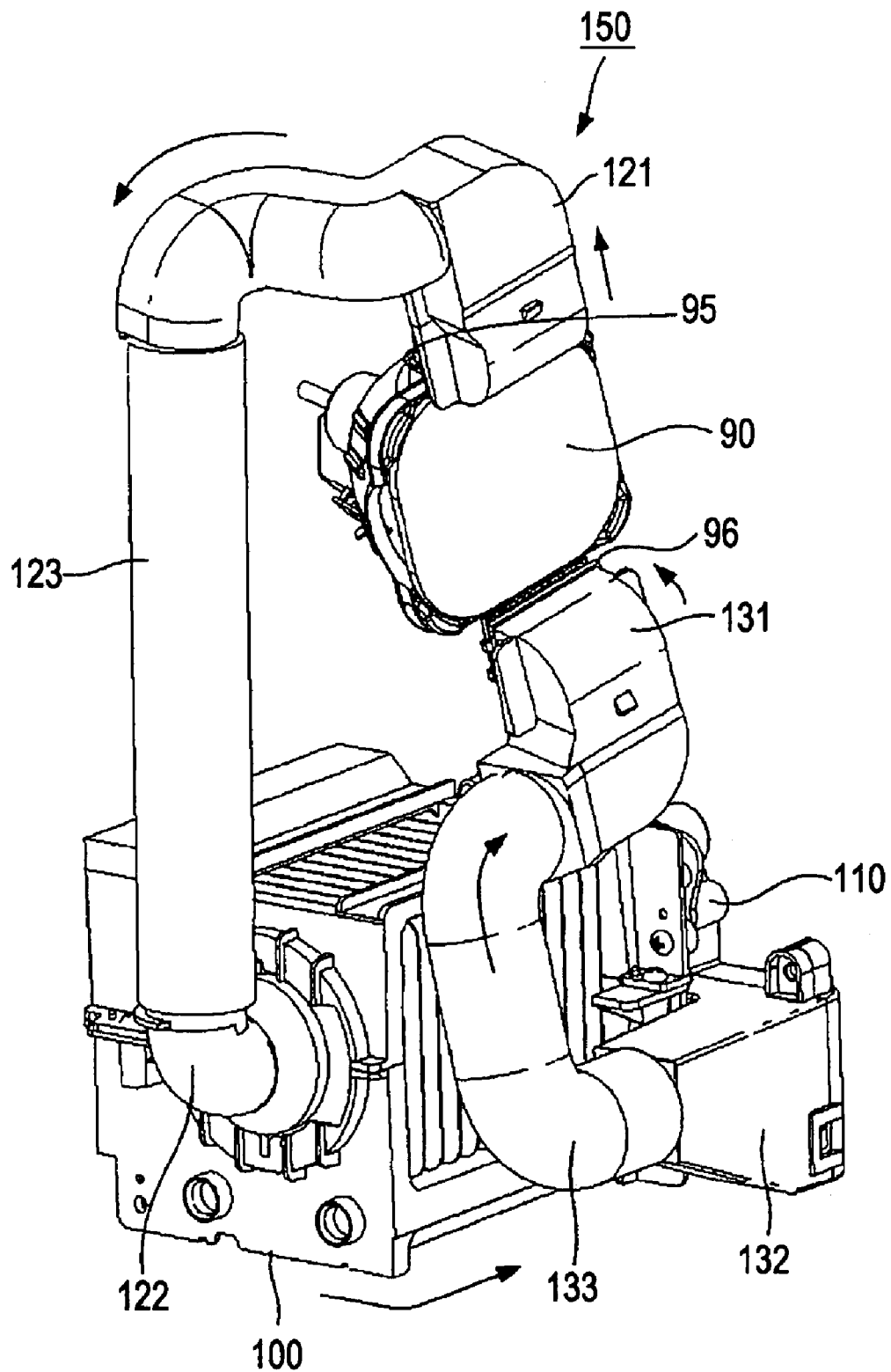
FIG. 33 is a perspective view of the lamp cooling device, FIG. 33 explaining the structure thereof in FIG. 32.

FIGS. 32 and 33 show the structure of the lamp cooling device 150. FIG. 32 is a schematic diagram explaining the structure. FIG. 33 is a perspective view of the lamp cooling device 150 and illustrates the components in FIG. 32. The lamp cooling device 150 includes the radiator 100 for heat radiation, the blower 110 for air circulation, duct assemblies 120 and 130, and the lamp 90. The blower 110 includes, for example, a sirocco fan. The duct assemblies 120 and 130 connect the components. The lamp 90 includes the connecting ducts 95 and 96 connected to the duct assemblies 120 and 130, respectively. The air circulation path of the lamp cooling device 150 is a closed pipe line isolated from the atmosphere in the cabinet.

In FIGS. 32 and 33, the radiator 100 is directly connected to the blower 110. The lamp 90 shown in FIG. 33 is actually connected to the optical unit 50 and the lamp cooling device 150 through the adaptor 85 in FIG. 31.

The duct assembly 120 includes the ducts 121 and 122 and the tube 123. The duct 121 is connected to the upper connecting duct 95 of the lamp 90. The duct 122 is connected to the radiator 100. The tube 123 is arranged between the two ducts 121 and 122.

The duct assembly 130 includes the ducts 131 and 132 and the tube 133. The duct 131 is connected to the lower connecting duct 96 of the lamp 90. The duct 132 is connected to the blower 110. The tube 133 is arranged between the two ducts 131 and 132.

In the lamp cooling device 150 with the above-described structure, when the lamp 90 emits light, the blower 110 supplies air to the lower connecting duct 96 of the lamp 90 through the duct assembly 130 (i.e., the duct 132, the tube 133, and the duct 131). The light source 91a heated at a high temperature is cooled with the supplied air. Simultaneously, the air is heated. The heated air is introduced into the duct assembly 120 (i.e., the duct 121, the tube 123, and the duct 122) through the upper connecting duct 95. The radiator 100 dissipates heat from the heated air. The cooled air is returned to the blower 110.

In other words, the blower 110 forcibly circulates air in the pipe line, the blower 110 dissipates heat from air heated in the lamp 90, and the lamp 90 is supplied with cooled air.

Figure 34:
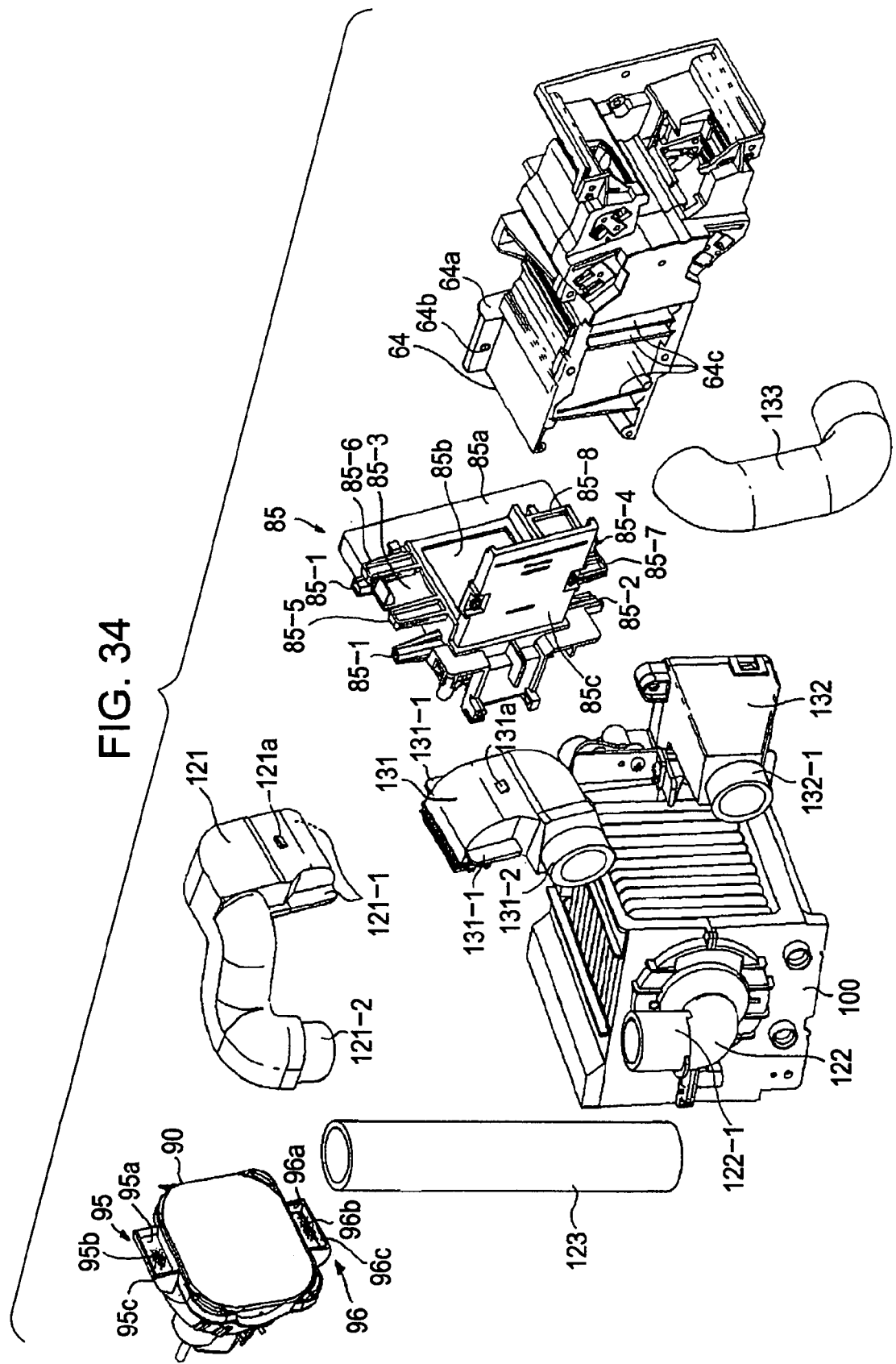
FIG. 34 is an exploded perspective view of the lamp cooling device, shown in FIG. 31, in the rear projection display apparatus in accordance with the embodiment of the present invention.
Figure 35:
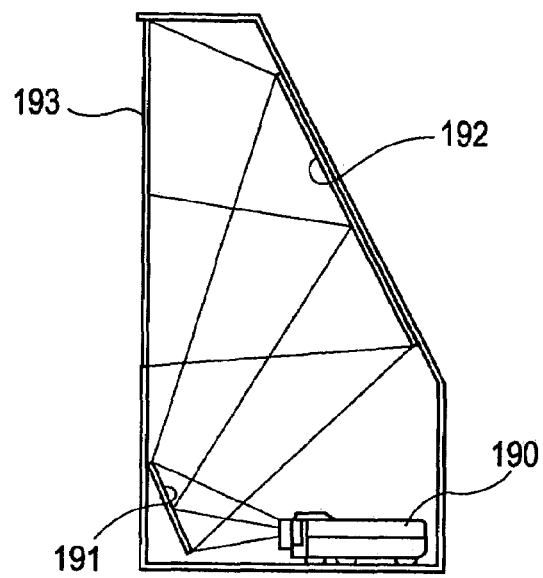
FIG. 35 is a diagram explaining an example of the optical path of an image projected on a screen of a known rear projection display apparatus.
Figure 36:
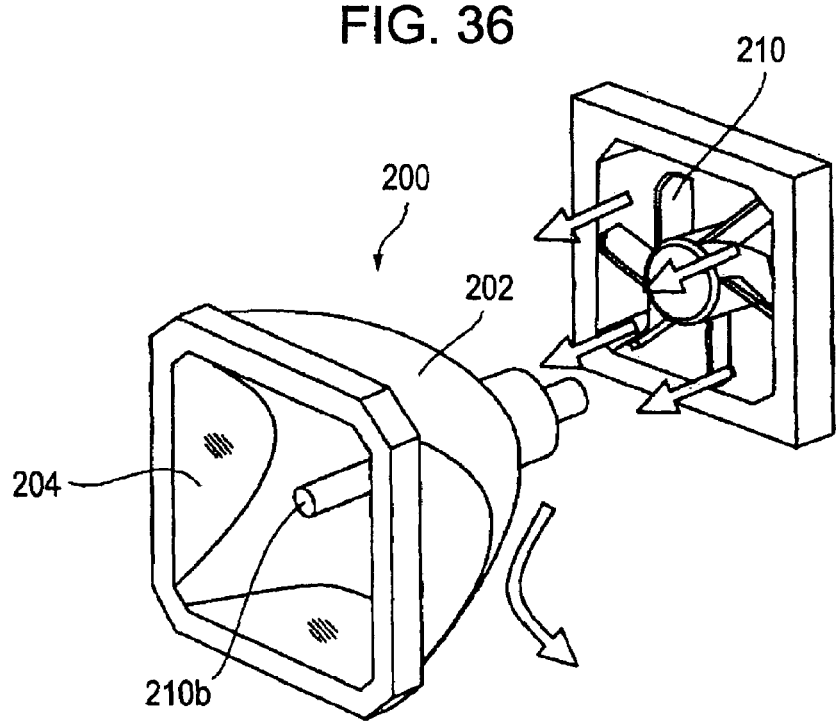
FIG. 36 is a perspective view of a lamp cooling mechanism in the known rear projection display apparatus.
Figure 37:
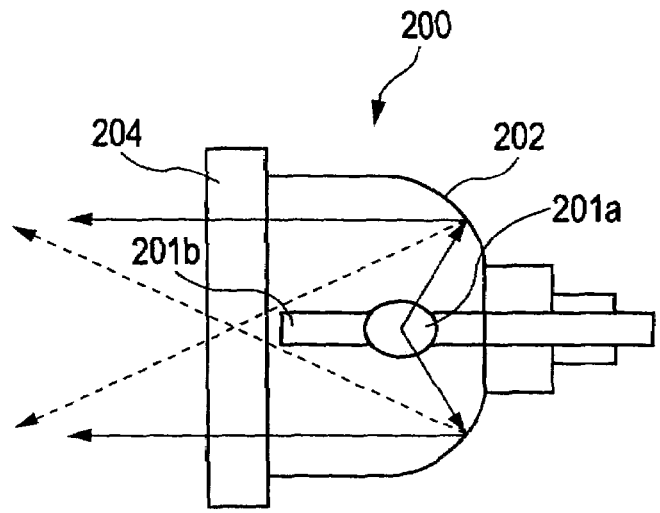
FIG. 37 is a sectional side elevation view of a lamp in FIG. 36.
Figure 38:
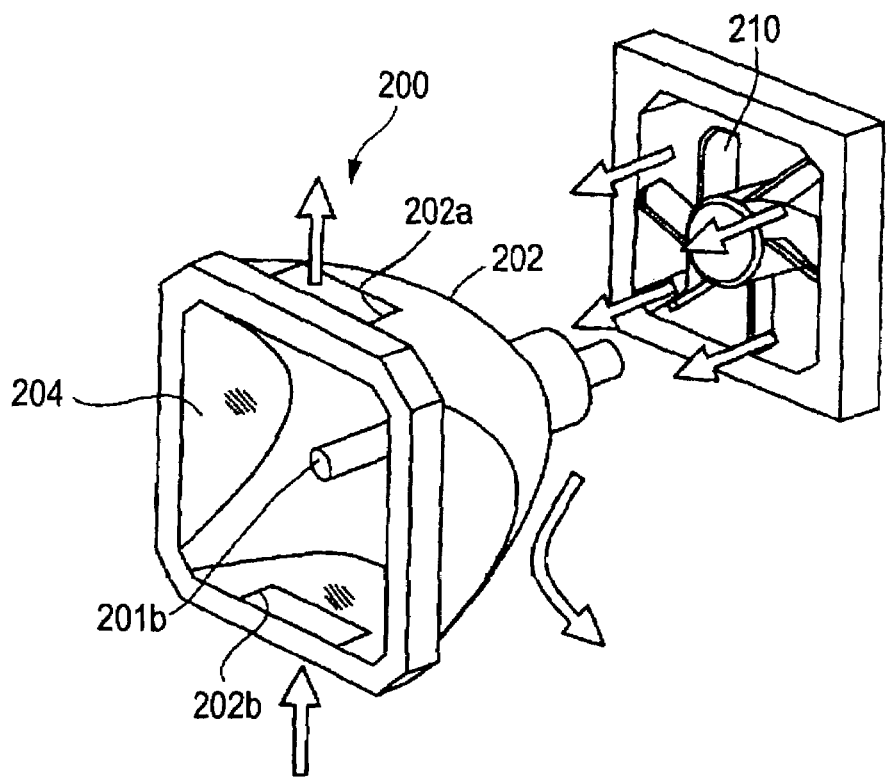
FIG. 38 is a perspective view of another lamp cooling mechanism in the known rear projection display apparatus.

FIG. 34 is an exploded perspective view of the lamp cooling device 150 and explains a connection state of the optical unit 50 and the lamp cooling device 150 in the vicinity of the lamp 90 shown in FIG. 31, the components being separated from each other for convenience of explanation.

As shown in FIGS. 32 and 33, the radiator 100 includes a plurality of radiating fins arranged outside the pipe line which gas (air) passes through. The blower 110 is arranged downstream of the flow of air and is directly connected to the radiator 100. Referring to FIG. 34, the duct 122, in which a cylindrical opening 122-1 faces upward, is connected to the air intake side of the radiator 100. The duct 132, in which a cylindrical opening 132-1 faces laterally, is connected to the blowing side of the blower 110.

On the other hand, the duct 121, which is connected to the upper connecting duct 95 of the lamp 90, extends upwardly and is bent laterally at about 90° and is further bent downwardly such that a cylindrical opening 121-2 faces downward. The duct 131, which is connected to the lower connecting duct 96 of the lamp 90, slightly extends downward and is bent laterally at about 90° such that a cylindrical opening 131-2 faces laterally.

The tube 123, which is substantially straight, is arranged between the cylindrical opening 121-2 of the duct 121 and the cylindrical opening 122-1 of the duct 122. The tube 133, which is U-shaped, is arranged between the cylindrical opening 131-2 of the duct 132 and the cylindrical opening 132-1 of the duct 132.

Each of the ducts 121, 122, 131, and 132 is made of heat-resistant plastic by molding. Each of the tubes 123 and 133 has a resistance to heat of about 200° C. and high flexibility. For example, each tube is made of sulfur-free resin, e.g., silicone resin because sulfur causes a reduction in the intensity of the lamp even if the material of the tube emits gas containing sulfur. The outer diameter of each of the openings 121-2, 122-1, 131-2, and 132-1 is larger than the inner diameter of each of the tubes 123 and 133 so that air tightness can be held when the tubes 123 and 133 are connected to the ducts.

Referring to FIG. 34, one end of the duct 121, connected to the connecting duct 95 of the lamp 90, has two wedges 121-1 on both sides, respectively. Similarly, one end of the duct 131, connected to the connecting duct 96 of the lamp 90, has two wedges 131-1 on both sides, respectively. The wedges 121-1 are fitted into respective upper grooves 85-1 of the adaptor 85 and the wedges 131-1 are fitted into respective lower grooves 85-2 thereof, thus locating the ducts 121 and 131 in respective predetermined positions.

Referring to FIG. 33 showing a state in which the lamp 90 is incorporated in the pipe line, the openings 95a and 96a of the upper and lower connecting ducts 95 and 95 of the lamp 90 are airtightly connected to the openings (not shown) at the respective ends of the ducts 121 and 131 through the frame seals 95c and 96c (see FIGS. 30A, 30B, and 34).

The connection state of the optical unit 50 and the lamp cooling device 150 will now be described.

The lamp cooling device 150 in FIG. 33 is secured to the light introducing section 64 of the optical unit 50 through the adaptor 85 as shown in FIG. 31.

Referring to FIG. 34, the adaptor 85 includes a frame 85a having a substantially rectangular opening 85b, and a substantially plate-shaped cover 85c which extends from the frame 85a perpendicular thereto. The two grooves 85-1, to which the respective wedges 121-1 of the duct 121 are fitted, are arranged in an upper portion of the frame 85a. The two grooves 85-2, to which the respective wedges 131-1 of the duct 131 are fitted, are arranged in a lower portion thereof.

A protrusion 85-3 is arranged in substantially the middle of the upper portion of the frame 85a and a protrusion 85-4 is arranged in substantially the middle of the lower portion thereof. In FIG. 34, the protrusion 85-3 has a recess on the rear surface, the recess receiving a protrusion 121a arranged on the duct 121. Similarly, the protrusion 85-4 has a recess on the rear surface, the recess receiving a protrusion 131a arranged on the duct 131.

Two guides 85-5 and 85-6 for guiding the duct 121 during attachment are arranged on both sides of the protrusion 85-3 of the frame 85a and two guides 85-7 and 85-8 for guiding the duct 131 during attachment are disposed on both sides of the protrusion 85-4. The light introducing section 64 has two upper and lower brackets 64a, which extend from a side surface of the section 64, and a screw insertion hole 64b. The frame 85a has two engagement portions (not shown), which are engaged with the upper and lower brackets 64a of the light introducing section 64, and a threaded hole (not shown) corresponding to the screw insertion hole 64b of the light introducing section 64.

The cover 85c is hermetically secured to the light introducing section 64 using fixing screws to shield a storage space for a plurality of color filters 64c from external light.

The adaptor 85 is secured to the light introducing section 64 by means of screws before the optical unit 50 is attached to the bottom frame segment 11.

Attachment of the optical unit 50 to the bottom frame segment 11 and connection of the optical unit 50 to the lamp cooling device 150 will now be described.

Attachment of the optical unit 50 to the bottom frame segment 11 will first be described with reference to FIGS. 25 to 27 and 29.

Figure 29:
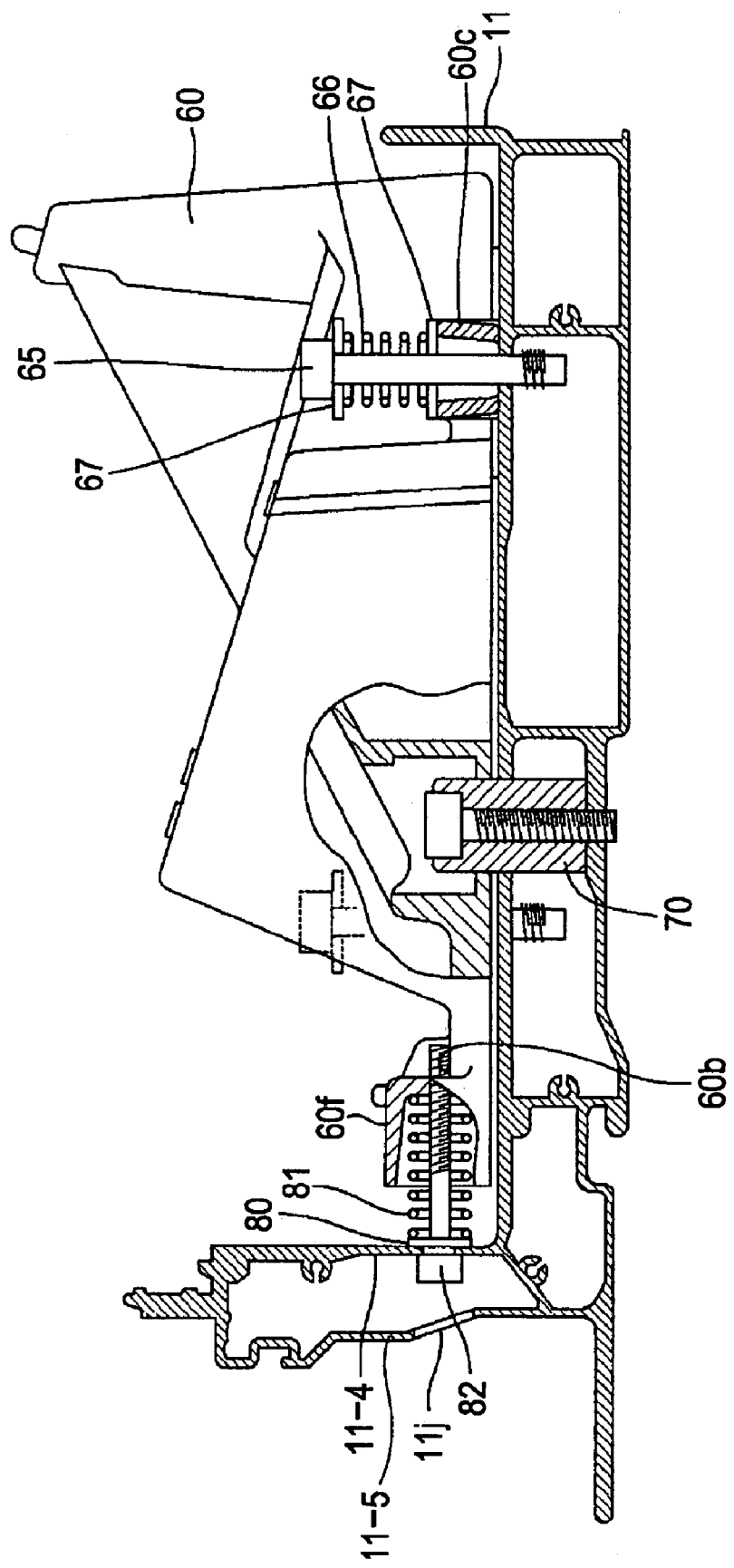
FIG. 29 is a partially cutaway, cross-sectional view of the optical unit attached to the bottom frame segment, FIG. 29 explaining adjustment of the optical unit of the rear projection display apparatus in accordance with the embodiment of the present invention.

FIG. 29 is a partially cutaway cross-sectional view of the optical unit 50 attached to the bottom frame segment 11. In FIG. 29, the components of the optical unit 50 are not shown except for the base block 60.

After the spring retainer 80 and the helical compression spring 81 in FIG. 27 are inserted into the cylindrical portion 60f, the optical unit 50 is attached to the bottom frame segment 11 so as to be rotatable within a predetermined angular range about the rotating shaft 70 on the bottom frame segment 11. Referring to FIGS. 25 and 29, the adjusting screw 82 is screwed into the threaded hole 60b in the cylindrical portion 60f of the base block 60 included in the optical unit 50 through the screw insertion hole 11j of the side wall 11-5 and the screw insertion hole 11k of the side wall 11-4 of the bottom frame segment 11.

Initially, the adjusting screw 82 is screwed into the threaded hole 60b such that a long side 60-7 of the region J of the base block 60 in FIG. 25 is substantially parallel to the side wall 11-4 of the bottom frame segment 11. In this state, the side wall 11-4 is brought into contact with the disc 80a of the spring retainer 80 and the bent portions 80d of the spring retainer 80 are inserted through the arcuate slots 60g of the cylindrical portion 60f, so that the strips 80c extend from the arcuate slots 60g.

The adjusting screw 82 is further screwed into the threaded hole 60b against the urging force caused by the helical compression spring 81. Thus, the base block 60 is rotated clockwise about the rotating shaft 70 on the surface 11-3 of the bottom frame segment 11 in FIG. 25. At that time, the adjusting screw 82 is screwed within the play provided by the difference in diameter between each of the three pin insertion holes 60c of the base block 60 and the shaft 65b of the associated attachment pin 65 until the helical compression spring 81 is completely compressed. During screwing, the base block 60 is slightly rotated by means of the urging force of the helical compression spring 81 so as not to form any clearance between the side wall 11-4 of the bottom frame segment 11 and the cylindrical portion 60f of the base block 60.

If the adjusting screw 82 is rotated in the direction of unscrewing from the threaded hole 60b, the base block 60 is rotated counterclockwise about the rotating shaft 70 on the surface 11-3 of the bottom frame segment 11 in FIG. 25.

In other words, screwing the adjusting screw 82 into the threaded hole 60b enables the base block 60 to slightly rotate about the rotating shaft 70 within the predetermined angular range determined between a state where the helical compression spring 81 is substantially completely compressed and a state where the bent portions 80d of the spring retainer 80 are engaged with the respective arcuate slots 60g of the cylindrical portion 60f, and further within the play provided by the difference in diameter between each of the pin insertion holes 60c of the base block 60 and the shaft 65b of the associated attachment pin 65.

As described above, the base block 60 is in contact with the bottom frame segment 11 through the protruded parts under the threaded hole 60b, the reference-level protrusion 60d-2, and the three pin insertion holes 60c in FIG. 25. Accordingly, the base block 60 can be held at a uniform level with high accuracy. Therefore, the base block 60 is easily rotated by applying a force to the cylindrical portion 60f of the base block 60, serving as the point of application, using the adjusting screw 82, so that the angular adjustment of the base block 60 can be easily performed.

Attachment of the optical unit 50 mounted on the base block 60 to the lamp cooling device 150 will now be described with reference to FIGS. 31 to 34.

The radiator 100 integrally connected to the blower 110 is fixed to a predetermined portion of the bottom frame segment 11. In this state, the adaptor 85 of the optical unit 50 is arranged above the radiator 100.

The wedges 121-1 of the duct 121 are fitted into the respective upper grooves 85-1 of the adaptor 85 and the wedges 131-1 of the duct 131 are fitted into the lower grooves 85-2 (see FIG. 34). At that time, the protrusions 121a and 131a of the ducts 121 and 131 are engaged with the protrusions 85-3 and 85-4 of the connecting duct 95, respectively (refer to FIG. 31), thus fixing the ducts 121 and 131 to the adaptor 85.

As shown in FIG. 31, the duct 121 is connected to the radiator 100 via the heat-resistant flexible tube 123 and the duct 131 is connected to the blower 110 through the similar tube 133.

Finally, the lamp 90 is disposed such that the openings 95a and 96a of the upper and lower connecting ducts 95 and 96 of the lamp 90 are tightly connected to the openings (not shown) of the ducts 121 and 131, respectively. In this instance, the lamp 90 is attached to the lamp cooling device 150 as follows: The lamp 90 is mounted on an attachment component (not shown) and an engaging portion of the attachment component is engaged with an engagement portion arranged on the adaptor 85.

In other words, the lamp 90 is connected to the radiator 100 and the blower 110, fixed to the bottom frame segment 11, through the flexible tubes 123 and 133 and is then held by the adaptor 85. Consequently, the lamp 90 is positioned in a predetermined location so as to be aligned to the optical unit 50.

As for adjustment of the optical unit 50 having the above-described structure, the optical unit 50 having the base block 60 is attached to the frame assembly and the adjusting screw 82 is screwed into the threaded hole 60b in the cylindrical portion 60f of the base block 60 to slightly rotate the optical unit 50 about the rotating shaft 70.

At that time, the attachment pins 65, each having the helical compression spring 66 for urging, are inserted through the respective pin insertion holes 60c in the base block 60 to press the base block 60 onto the frame assembly (the bottom frame segment 11). In addition, the optical unit 50 is slightly rotated within the play provided by the difference in diameter between each of the pin insertion holes 60c and the shaft 65b of the associated attachment pin 65, so that the optical path from the optical unit 50 to the projection mirror 30 can be changed.

Since the lamp 90 is held through the flexible tubes 123 and 133 of the lamp cooling device 150, the lamp 90 can be rotated together with the optical unit 50 about the rotating shaft 70 without receiving excess force during the adjustment of the optical unit 50.

The helical compression spring 81 received in the cylindrical portion 60f has a large spring constant. Advantageously, even when external force, such as vibration, is applied to the optical unit 50 after the angular adjustment of the optical unit 50, the helical compression spring 81 can absorb the external force. Even if the optical unit 50 is temporarily deviated from the adjusted position, the optical unit 50 can be easily returned to the adjusted position.

The display unit 2 of the rear projection display apparatus with the above-described structure is assembled as follows.

First, as shown in FIG. 5, the optical unit 50 connected to the adaptor 85 is attached to the frame assembly of FIG. 6 in such a manner that the rotating shaft 70 is inserted into the locating hole 11m in the bottom frame segment 11, and the optical unit 50 is rotatably attached to the bottom frame segment 11 within the predetermined angular range through the three attachment pins 65, each having the helical compression spring 66 between the washers 67. In this instance, the ducts 121 and 131 are previously connected to the adaptor 85 (refer to FIG. 34). The adjusting screw 82 is screwed into the threaded hole 60b such that the long side 60-7 of the base block 60 in FIG. 25 is substantially parallel to the side wall 11-4 of the bottom frame segment 11 (refer to FIG. 29).

Subsequently, the blower 110 and the radiator 100 are attached to the bottom frame segment 11 while the duct 132 is connected the blower 110, the duct 122 is connected to the radiator 100, and the blower 110 is connected to the blower 110. The tube 123 is attached between the ducts 121 and 122 and the tube 133 is attached between the ducts 131 and 132 (refer to FIG. 34).

The lamp 90 mounted on the attachment component (not shown) is attached to the adaptor 85. At that time, the seals 95c and 96c of the upper and lower connecting ducts 95 and 96 of the lamp 90 are brought into tight contact with surfaces (not shown) of the ducts 121 and 131, thus providing air tightness. The light source 91a of the lamp 90 is positioned in the predetermined location so as to be aligned with the optical path of the optical unit 50 (refer to FIG. 31). The path of air circulation for cooling the lamp 90 shown in FIG. 32 is completely constructed.

The air circulation path of the lamp cooling device 150 in accordance with the present embodiment is a closed pipe line as shown in FIG. 33. Since the flexible tubes 123 and 133 of silicone region are included in the pipe line, the lamp cooling device 150 has the following advantages: Even when the lamp 90 bursts, mercury enclosed in the light source 91a is not leaked out of the lamp cooling device 150. The wire sheets 95b and 96b of the connecting ducts 95 and 96 prevent large pieces of broken glass from dropping, thus protecting the blower 110 and the radiator 100.

On the other hand, the shaft pieces 38 and 39, shown in FIG. 7B, of the projection mirror 30 in FIG. 7B are slidable in the groove 14a of the top frame segment 14 in FIG. 11A such that the projection mirror 30 is rotatable. The projection mirror 30 is arranged at a predetermined angle by the mirror fixing plate 19. In this instance, the shafts 38a of the shaft pieces 38 are engaged with the mirror shaft bearings 2a and 2b, shown in FIG. 4, arranged in the upper portions of the left and right frame segments 12 and 13, so that the projection mirror 30 is pivotable.

The screen 3 is arranged on the surface of the screen frame, composed of the frame segments 11, 12, 13, and 14, opposite to the surface adjacent to the optical unit 50 in FIG. 5. As shown in FIG. 4, the four screen retainers 9a, 9b, 9c, and 9d retain four ends of the screen 3.

The left and right screen retainers 9b and 9c in FIG. 4 are arranged on the screen 3 having a multilayered structure as follows: Referring to FIGS. 11B, 11C, and 15, the left and right ends of the screen 3 are covered with the elastic shock absorbing sheets 3a, the left screen retainer 9b is arranged such that the surface 12-1 of the left frame segment 12 is in contact with the left end of the screen 3 with the shock absorbing sheet 3a therebetween, and the right screen retainer 9c is arranged such that the surface 13-1 of the right frame segment 13 is in contact with the right end of the screen 3 with the shock absorbing sheet 3a therebetween. The left and right screen retainers 9b and 9c are fixed to the screen 3 so as not to deform the screen 3. Similarly, the upper and lower screen retainers 9a and 9d are fixed to the screen 3 so as not to deform the screen 3 (refer to FIG. 4).

Thus, the display unit 2 is assembled. FIG. 5 shows the rear of the assembled display unit 2. FIG. 4 shows the front thereof. In the front of the display unit 2, the foot plates 25 fixed to the plate-shaped part 11f of the bottom frame segment 11 are covered with the foot cover 7. As shown in FIG. 3, while the outer frame 4 and the cover frame 6 are arranged on the front of the display unit 2, the rear cover 5 is arranged on the rear of the display unit 2 so as to cover the optical unit 50 and is secured to the outer frame 4 using screws. During securing of the cover frame 6 and the outer frame 4, the speaker units 8 shown in FIG. 2 are arranged on both sides of the rear projection display apparatus in accordance with the present embodiment.

When the mirror adjustment lid 5a arranged on the top of the rear cover 5 in FIG. 2 is opened, the mirror fixing plate 19 in FIG. 16 is exposed. The angle of inclination of the projection mirror 30 can be finely adjusted by loosening the fixing screw 23 and rotating the adjusting screw 21. In other words, when the angle of inclination of the projection mirror 30 is increased, the center of a projected image is moved downwardly. When the angle of inclination of the projection mirror 30 is reduced, the center of a projected image is moved upwardly. Fine adjustment can be performed in this manner.

An adjusting tool for rotating the adjusting screw 82 is inserted into the adjustment hole 2c (the screw insertion hole 11j in FIG. 29) exposed in a lower portion of the outer frame 4 to rotate the adjusting screw 82. Thus, the optical unit 50 attached to the bottom frame segment 11 is rotated about the rotating shaft 70, so that an image projected on the screen 3 can be adjusted. As an adjusting tool, when the adjusting screw 82 is, for example, a hexagon socket head cap screw, an Allen wrench is used.

In other words, the following adjustment can be easily performed. When the optical unit 50 is rotated clockwise about the rotating shaft 70 in FIG. 25, the center of an image projected on the screen 3 is moved to the left in the screen 3 as viewed from the front of the screen 3. When the optical unit 50 is rotated counterclockwise about the rotating shaft 70 in FIG. 25, the center of an image on the screen 3 is moved to the right in the screen 3 as viewed from the front of the screen 3.

During adjustment of the optical unit 50, the radiator 100 and the blower 110 are fixed to the bottom frame segment 11 and only the lamp 90 integrally connected to the optical unit 50 can be moved independent of the radiator 100 and the blower 110. Advantageously, the adjustment can be performed by applying a small force. Since the connecting ducts 95 and 96 of the lamp 90 are connected to the radiator 100 and the blower 110 through the tubes 123 and 133, the adjustment can be performed without reducing the cooling performance and applying excess force to the lamp 90.

As described above, in the rear projection display apparatus in accordance with the present embodiment, since the optical unit 50 is attached to the bottom frame segment 11 such that the optical unit 50 is rotatable about the rotating shaft 70 arranged on the bottom frame segment 11 within the predetermined angular range by screwing the adjusting screw 82, an image as viewed from the front of the screen 3 can be adjusted by moving the optical unit 50. During adjustment (see FIG. 25), since the lamp 90 is integrally connected to the optical unit 50, the lamp 90 can be moved such that excess force is not applied to the lamp 90. In addition, since the lamp 90 can be turned on while the air tightness in the air circulation path is held, the entry of dust into the air circulation path can be remarkably reduced. Advantageously, a reduction in the intensity of the lamp 90 or the cooling performance is not caused by attachment of dust on the light source 91a and/or the reflector 202 and burn of the dust. The life span of the lamp 90 can be extended.

Since the air circulation path is formed as a closed pipe line and the flexible tubes 123 and 133 are included in the pipe line, the impact of the burst of the lamp 90 is absorbed by deformation of the tubes 123 and 133. Leakage of the sound of the burst can be suppressed. Further, pieces of broken glass can be prevented from scattering to the outside.

Since the lamp cooling device in accordance with the present embodiment uses the flexible tube as each duct connected to the lamp, the path for circulation of a gas serving as a cooling medium can be hermetically held, the gas circulation path can be flexibly held in response to the movement of the lamp, and the entry of dust into the circulation path can be restricted, thus preventing a reduction in the intensity of the lamp caused by attachment of the dust on the reflector and/or the light source of the lamp. Even if the lamp bursts, pieces of broken glass and/or a material, e.g., mercury enclosed in the light source can be prevented from scattering to the outside of the circulation path.

Further, each tube is made of silicone resin having flexibility and heat resistance. Advantageously, a reduction in the intensity of the lamp is not caused by deposition of sulfur contained in an outgas on the surface of the reflector and/or that of the light source of the lamp. In addition, the pipe line serving as the circulation path can be easily assembled because the tubes are made of the flexible material. Advantageously, the lamp cooling device can be installed in a complicated location, leading to a reduction in installation space and a reduction in size of the display device.

In addition, the flexible tubes can absorb vibration of the blower for producing a circulating gas flow. Thus, the life span of the lamp heated at a high temperature can be extended.

In the rear projection display apparatus in accordance with the present embodiment, the lamp is flexibly held by the lamp cooling device through the flexible tubes, so that the lamp can be moved together with the optical unit independent of the lamp cooling device during fine angular adjustment of the optical unit on the bottom frame segment. Advantageously, even in a thin display apparatus that needs precise adjustment, the optical unit can be easily adjusted after the lamp is replaced.

The present invention is not limited to the rear projection display apparatus according to the above-described embodiment but many modifications and variations can be formed without departing from the spirit and scope of the invention. For example, in the above-described embodiment, the reflective liquid crystal display panels are used in the optical unit. A transmissive liquid crystal display panel may be used. Alternatively, a digital light processing (DLP) display panel using a micro mirror device may be used. In the above-described embodiment, the tubes 123 and 133 are arranged as parts of the circulation path. The arrangement is not limited to the above example. The whole of the pipe line may be composed of those tubes. In the above-described embodiment, the silicone resin tubes are used in view of the heat resistance. If the temperature of a circulating gas is relatively low, rubber, such as EPDM (ethylene-propylene-diene monomer) rubber, may be used as a material for the tubes. Fluorocarbon resin, although having lower flexibility, may be used in view of its heat resistance.

In circumstances where a low power lamp is used, the difference in temperature between heated air and cooled air is not so large, and there is no fear of generation of outgas, a non-rubber material, e.g., polyphenylene sulfide (PPS), may be used. To provide flexibility, a tube having a bellows structure may be used instead of a straight tube.

It should be understood by those skilled in the art that various modifications, combinations, sub-combinations and alterations may occur depending on design requirements and other factors insofar as they are within the scope of the appended claims or the equivalents thereof.

What is claimed is:

1. A lamp cooling device for cooling a lamp including a transparent front plate, a reflector that reflects light emitted from a light source to the transparent front plate, and the light source disposed in an interior space enclosed by the transparent front plate and the reflector, the lamp cooling device comprising:

a pipe line through which a gas is circulated, the lamp having a gas intake opening and a gas exhaust opening, the openings communicating with the interior space, the pipe line being connected to both of the gas intake opening and the gas exhaust opening so as to include the interior space of the lamp, and the pipe line comprising a first flexible portion connected to the gas intake opening and a second flexible portion connected to the gas exhaust opening.

2. The device according to claim 1, wherein a material of the pipe line exhibits a resistance to ultraviolet rays radiated from the lamp and a resistance to heat of about 200° C.

3. The device according to claim 2, wherein each flexible portion in the pipe line is composed of a flexible sulfur-free resin.

4. The device according to claim 3, wherein each flexible portion includes a silicone resin tube.

5. The device according to claim 1, further comprising:

a blower disposed in the pipe line, the blower forcibly circulating the gas in the closed pipe line.

6. The device according to claim 1, further comprising:

a cooler to cool the gas circulated in the closed pipe line.

7. The device according to claim 1, wherein a wire sheet is arranged in each of the gas intake opening and the gas exhaust opening of the lamp so as to cover the opening.

8. The device according to claim 1, wherein the pipe line is detachably connected to each of the gas intake opening and the gas exhaust opening of the lamp through an air tight seal.

9. A rear projection display apparatus comprising:

a cabinet;

a lamp including a transparent front plate, a reflector reflecting light emitted from a light source to the transparent front plate, and the light source disposed in an interior space enclosed by the transparent front plate and the reflector;

a lamp cooling device for cooling the lamp; and an optical unit having a projection lens and a projection mirror, the lamp, the lamp cooling device, and the optical unit being arranged in the cabinet, the lamp cooling device including a closed pipe line through which a gas is circulated, the lamp having a gas intake opening and a gas exhaust opening, the openings communicating with the interior space of the lamp, the closed pipe line being connected to the gas intake opening and the gas exhaust opening so as to include the interior space of the lamp, the closed pipe line including a flexible portion connected to the gas intake opening and another flexible portion connected to the gas exhaust opening, the lamp cooling device further including a blower that forcibly circulates the gas in the closed pipe line, and a cooler that cools the gas circulated in the closed pipe line, the lamp being positioned so as to be integrally connected to the optical unit, the blower and the cooler being fixed to the cabinet.

* * * * *